United States Patent
Vogelsang et al.

(10) Patent No.: US 10,594,973 B2
(45) Date of Patent: *Mar. 17, 2020

(54) CONDITIONAL-RESET, MULTI-BIT READ-OUT IMAGE SENSOR

(71) Applicant: Rambus Inc., Sunnyvale, CA (US)

(72) Inventors: Thomas Vogelsang, Mountain View, CA (US); Michael Guidash, Rochester, NY (US); Song Xue, San Jose, CA (US); James E. Harris, Tyler, TX (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,093

(22) Filed: Apr. 25, 2017

(65) Prior Publication Data

US 2017/0324920 A1 Nov. 9, 2017

Related U.S. Application Data

(63) Continuation of application No. 14/433,003, filed as application No. PCT/US2013/062550 on Sep. 30, 2013, now Pat. No. 9,667,898.

(Continued)

(51) Int. Cl.
*H04N 5/335* (2011.01)
*H04N 5/355* (2011.01)
(Continued)

(52) U.S. Cl.
CPC .......... *H04N 5/378* (2013.01); *H04N 5/3355* (2013.01); *H04N 5/3559* (2013.01);
(Continued)

(58) Field of Classification Search
None
See application file for complete search history.

(56) References Cited

U.S. PATENT DOCUMENTS

| 7,176,438 B2 | 2/2007 | Bamji et al. |
| 7,218,350 B2 | 5/2007 | Hynecek |

(Continued)

FOREIGN PATENT DOCUMENTS

| EP | 0295588 B1 | 4/1993 |
| EP | 1233613 A2 | 8/2002 |

(Continued)

OTHER PUBLICATIONS

Acosta-Serafini et al., "A 1/3" VGA Linear Wide Dynamic Range CMOS Image Sensor Implementing a Predictive Multiple Sampling Algorithm With Overlapping Integration Intervals," IEEE Journal of Solid-State Circuits, vol. 39, No. 9, Sep. 2004, pp. 1487-1496. 10 pages.

(Continued)

*Primary Examiner* — Quan Pham
(74) *Attorney, Agent, or Firm* — Charles Shemwell

(57) ABSTRACT

An image sensor architecture with multi-bit sampling is implemented within an image sensor system. A pixel signal produced in response to light incident upon a photosensitive element is converted to a multiple-bit digital value representative of the pixel signal. If the pixel signal exceeds a sampling threshold, the photosensitive element is reset. During an image capture period, digital values associated with pixel signals that exceed a sampling threshold are accumulated into image data.

20 Claims, 15 Drawing Sheets

Related U.S. Application Data

(60) Provisional application No. 61/747,286, filed on Dec. 29, 2012, provisional application No. 61/710,621, filed on Oct. 5, 2012.

(51) Int. Cl.

| | | |
|---|---|---|
| *H04N 5/369* | (2011.01) | |
| *H04N 5/376* | (2011.01) | |
| *H04N 5/378* | (2011.01) | |
| *H04N 5/3745* | (2011.01) | |

(52) U.S. Cl.
CPC ..... *H04N 5/35545* (2013.01); *H04N 5/35554* (2013.01); *H04N 5/379* (2018.08); *H04N 5/3765* (2013.01); *H04N 5/37455* (2013.01); *H04N 5/35536* (2013.01)

(56) References Cited

U.S. PATENT DOCUMENTS

| | | | |
|---|---|---|---|
| 7,514,716 | B2 | 4/2009 | Panicacci |
| 7,956,912 | B2 | 6/2011 | Berezin |
| 8,169,517 | B2 | 5/2012 | Poonnen et al. |
| 8,212,906 | B2 | 7/2012 | Panicacci |
| 8,269,869 | B2* | 9/2012 | Ohki .................. H04N 5/35554 348/297 |
| 8,629,927 | B2 | 1/2014 | Bechtel et al. |
| 9,667,898 | B2 | 5/2017 | Vogelsang et al. |
| 2003/0006364 | A1 | 1/2003 | Katzir et al. |
| 2007/0262237 | A1 | 11/2007 | Mann |
| 2008/0036884 | A1* | 2/2008 | Hayashi ............... H04N 5/2351 348/250 |
| 2008/0074523 | A1 | 3/2008 | Panicacci |
| 2008/0218614 | A1 | 9/2008 | Joshi et al. |
| 2009/0059044 | A1 | 3/2009 | Tay |
| 2009/0284634 | A1* | 11/2009 | Tsukimura ........... H04N 5/3598 348/308 |
| 2010/0187407 | A1 | 7/2010 | Bechtel et al. |
| 2010/0188540 | A1 | 7/2010 | Bechtel et al. |
| 2011/0007201 | A1 | 1/2011 | Yoshioka |
| 2011/0013064 | A1* | 1/2011 | Lahav .................... H04N 5/335 348/296 |
| 2011/0291019 | A1 | 12/2011 | Yuan et al. |
| 2012/0176501 | A1 | 7/2012 | Yoo et al. |
| 2012/0249824 | A1* | 10/2012 | Lim ........................ H03M 1/56 348/222.1 |
| 2013/0003928 | A1 | 1/2013 | Pietig et al. |
| 2013/0208157 | A1 | 8/2013 | Bechtel et al. |

FOREIGN PATENT DOCUMENTS

| | | |
|---|---|---|
| JP | 2003-259234 A | 9/2003 |
| WO | WO-2008-027212 A1 | 3/2008 |
| WO | WO-2008-062404 A2 | 5/2008 |
| WO | WO-2010-084493 A1 | 7/2010 |

OTHER PUBLICATIONS

EP Response with EP Appln, No. 13789064.6 filed on Nov. 30, 2015 in Response to the EP Official Communication dated May 22, 2015. 26 Pages.

PCT International Preliminary Report on Patentability dated Apr. 15, 2015 (Chapter I) in International Application No. PCT/US2013/061248. 9 pages.

PCT International Preliminary Report on Patentability dated Apr. 16, 2015 (Chapter I) in International Application No. PCT/US2013/052550, 11 pages.

PCT International Search Report and Written Opinion dated Apr. 11, 2014 in International Application No. PCT/US2013/062550. 16 pages.

PCT International Search Report dated Apr. 8, 2014 in International Application No. PCT/US2013/061248. 13 pages.

Woo et al., "Smart Reset Control for Wide-Dynamic-Range LWIR FPAs," IEEE Sensors Journal, vol. 11, No. 1, Jan. 2011, pp. 131-136. 6 pages.

Yang et al, "High Dynamic Range CMOS Image Sensor With Conditional Reset," Proceedings of the 2002 Custom Integrated Circuits Conference, May 12-15, 2012, pp. 265-268. 4 pages.

CN Response Filed on Nov. 13, 2017 in Response to CN Office Action dated Jun. 28, 2017 re: CN Appln. No. 2013800524104. 32 Pages. (W/Translation).

JP Final Office Action dated Feb. 23, 2018 re: JP Appln. No. 2015-535711. 4 Pages. (With Translation).

CN Office Action dated Jun. 28, 2017 re: CN Appln. No. 2013800524104. 16 Pages. (With Translation).

Communication Pursuant to Article 94(3) EPC dated Nov. 29, 2016 re: EP Appln. No. 13789064.6. 5 Pages.

EP Response as Filed Apr. 24, 2017 in Response to EP Official Communication dated Nov. 29, 2016 re: EP Appln. No. 13739064.6. 34 Pages.

JP Office Action dated Apr. 24, 2017 re: JP Appln. No. 2015-535711. 11 Pages. (With Translation).

KR Notice of Preliminary Rejection dated Apr. 17, 2019 re: KR Appln. No. 10-2015-7011740. 12 Pages. (W/ Translation).

\* cited by examiner

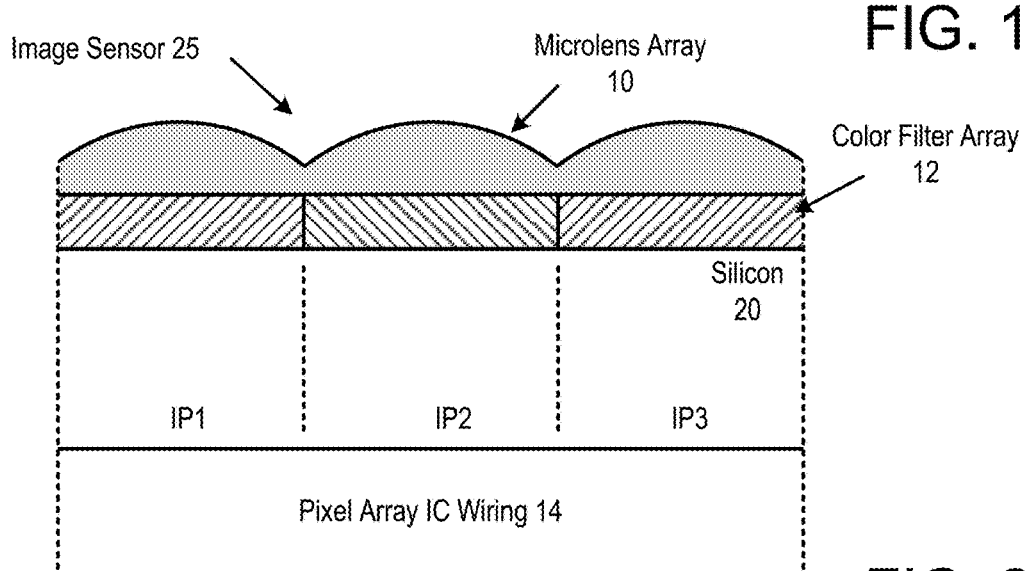
FIG. 1
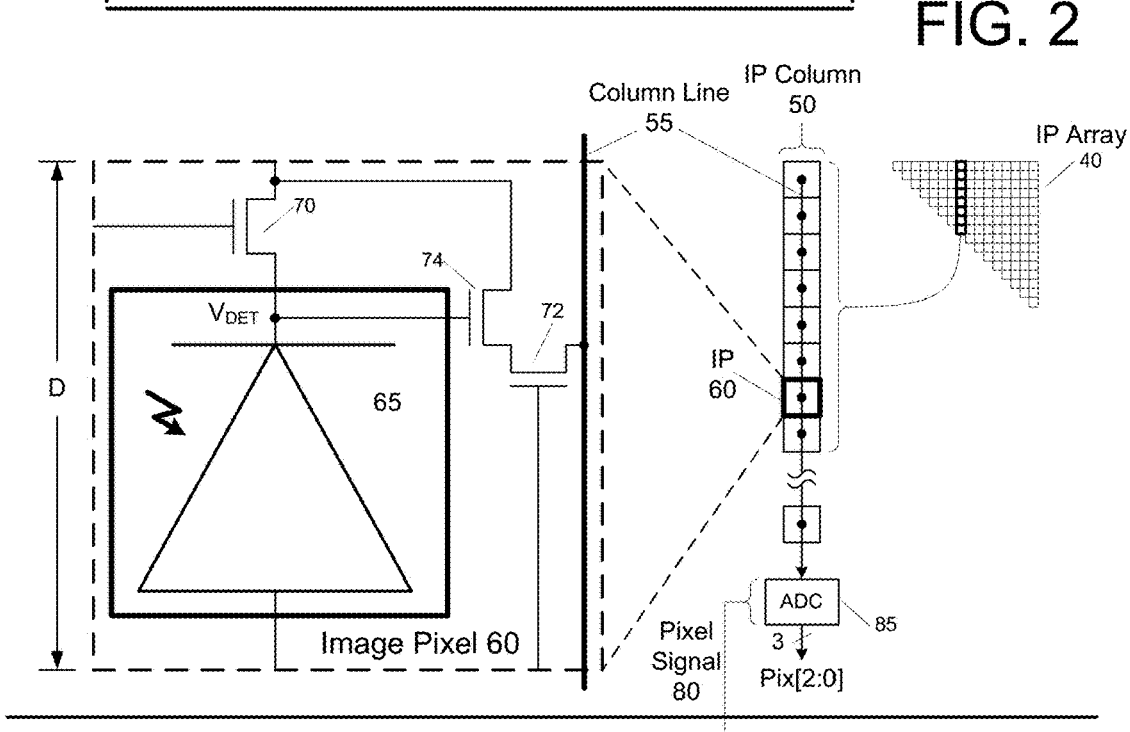
FIG. 2
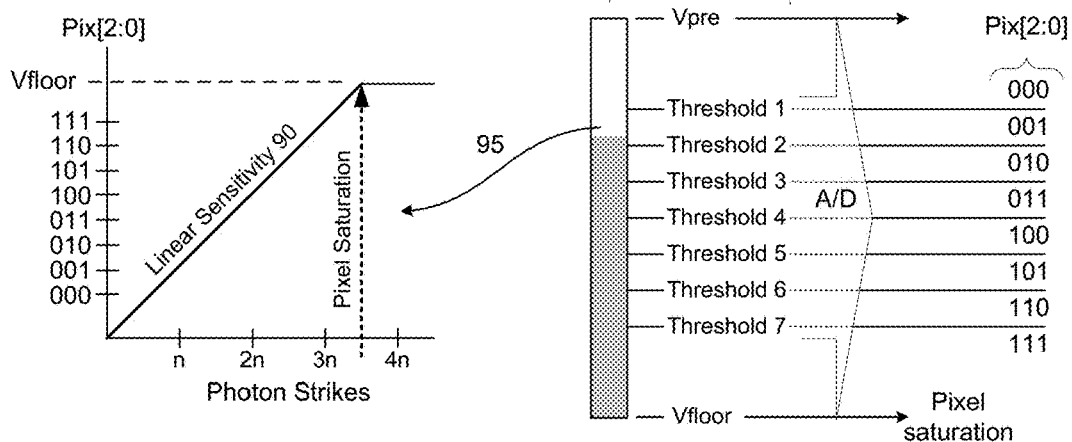

| Control | Sampling interval | Photons (det. - accum.) | Threshold met? | ADC value | Memory Element |
|---|---|---|---|---|---|
| Begin exposure, Threshold = 20 | 0 | N/A | N/A | X X X X X | X X X X X X X X X |
| | 1 | 4 - 4 | n | 0 0 1 0 0 | 0 0 0 0 0 0 0 0 0 |
| | 2 | 7 - 11 | n | 0 1 0 1 1 | 0 0 0 0 0 0 0 0 0 |
| | 3 | 2 - 13 | n | 0 1 1 0 1 | 0 0 0 0 0 0 0 0 0 |
| | 4 | 11 - 24 | y | 1 1 0 0 0 →| 0 0 0 0 1 1 0 0 0 |
| | 5 | 14 - 14 | n | 0 1 1 1 0 | 0 0 0 0 1 1 0 0 0 |
| | 6 | 8 - 22 | y | 1 0 1 1 0 →| 0 0 0 1 0 1 1 1 0 |
| | 7 | 4 - 4 | n | 0 0 1 0 0 | 0 0 0 1 0 1 1 1 0 |
| | 8 | 0 - 4 | n | 0 0 1 0 0 | 0 0 0 1 0 1 1 1 0 |
| | 9 | 6 - 10 | n | 0 1 0 1 0 | 0 0 0 1 0 1 1 1 0 |
| | 10 | 13 - 23 | y | 1 0 1 1 1 →| 0 0 1 0 0 0 1 0 1 |
| | 11 | 1 - 1 | n | 0 0 0 0 1 | 0 0 1 0 0 0 1 0 1 |
| | 12 | 2 - 3 | n | 0 0 0 1 1 | 0 0 1 0 0 0 1 0 1 |
| | 13 | 12 - 15 | n | 0 1 1 1 1 | 0 0 1 0 0 0 1 0 1 |
| | 14 | 13 - 28 | y | 1 1 1 0 0 →| 0 0 1 1 0 0 0 0 1 |
| | 15 | 26 - 26 | y | 1 1 0 1 0 →| 0 0 1 1 1 1 0 1 1 |
| Reset, Residue | 16 | 19 - 19 | n | 1 0 0 1 1 →| 0 1 0 0 0 1 1 1 0 |

Residue 190     Image data 195

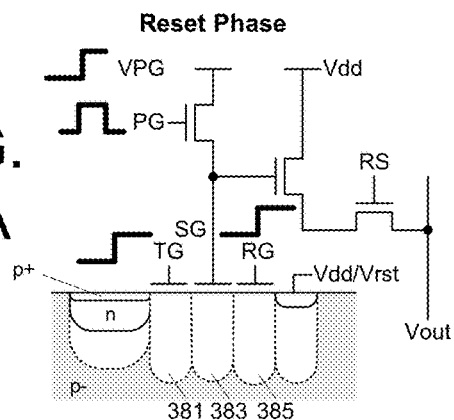
FIG. 18A  Reset Phase
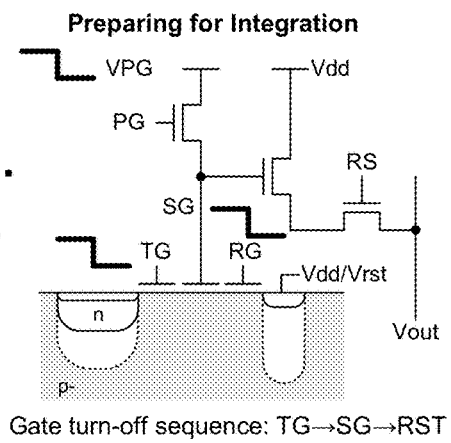
FIG. 18B  Preparing for Integration
Gate turn-off sequence: TG→SG→RST
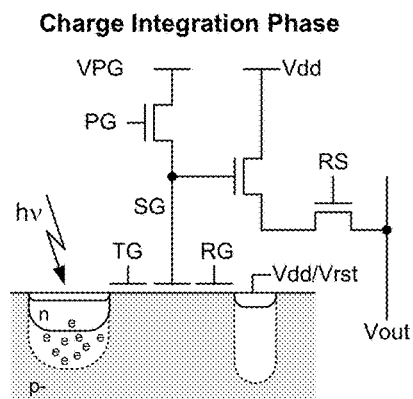
FIG. 18C  Charge Integration Phase
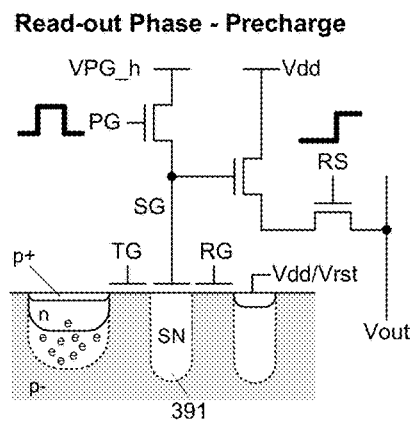
FIG. 18D  Read-out Phase - Precharge
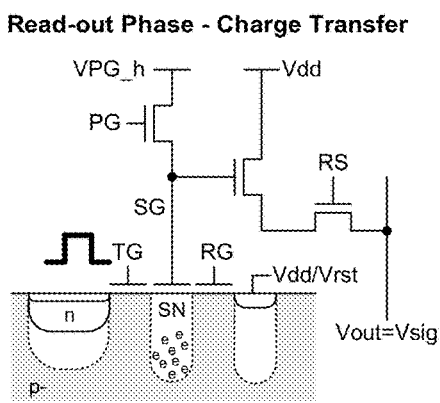
FIG. 18E  Read-out Phase - Charge Transfer
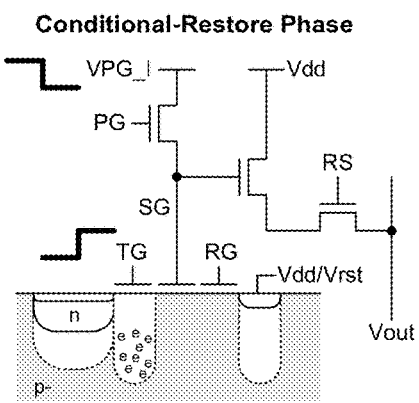
FIG. 18F  Conditional-Restore Phase
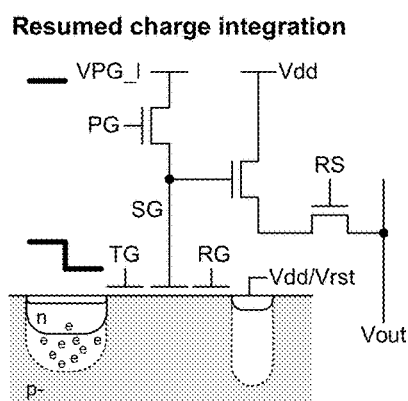
FIG. 18G  Resumed charge integration Per-Pixel Frame Processing

Abbreviations:

FTS[ ]: in-frame time stamp
IFI[ ]: IFI value (accumulated)
RTS[ ][ ]: reference pixel time stamp
SF: subframe
SFC[ ]: subframe timecode
RI[ ][ ]: raw image data
Iout[ ][ ]: output image (output frame value)
RP[ ][ ]: reference pixel value

CONDITIONAL-RESET, MULTI-BIT READ-OUT IMAGE SENSOR

TECHNICAL FIELD

The present disclosure relates to the field of electronic image sensors, and more specifically to a sampling architecture for use in such image sensors.

BACKGROUND

Digital image sensors, such as CMOS or CCD sensors, include a plurality of photosensitive elements ("photosensors") each configured to convert photons incident upon the photosensors ("captured light") into electric charge. The electric charge can then be converted into image data representing the light captured by each photosensor. The image data includes a digital representation of the captured light, and may be manipulated or processed to produce a digital image capable of display on a viewing device. Image sensors are implemented in integrated circuits ("ICs") with a physical surface that may be divided into a plurality of pixel regions (for instance, one or more photosensors and attendant control circuitry) configured to convert light into an electrical signal (charge, voltage, current, etc.). For convenience, pixel regions within an image sensor may also be referred to as image pixels ("IPs") and the aggregate of the pixel regions or image pixels will be referred to as the image sensor region. An image sensor IC typically will also include areas outside of the image sensor region, for example certain types of control, sampling, or interface circuitry. Most CMOS image sensors contain A/D (analog-to-digital) circuitry to convert pixel electrical signals into digital image data. The A/D circuitry can be one or more ADCs (analog-to-digital converters) located within or at the periphery of the image sensor region.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 1 illustrates a cross-section of a portion of an image sensor, according to one embodiment;

FIG. 2 illustrates partial array circuitry of an analog pixel image sensor with multiple pixel signal thresholds, according to one embodiment useful, e.g., in the layout of FIG. 1;

FIGS. 18A-18G illustrate exemplary states of the conditional-reset pixel of FIG. 15 during the operational phases shown in FIGS. 16 and 17;

DETAILED DESCRIPTION

Figure 3:
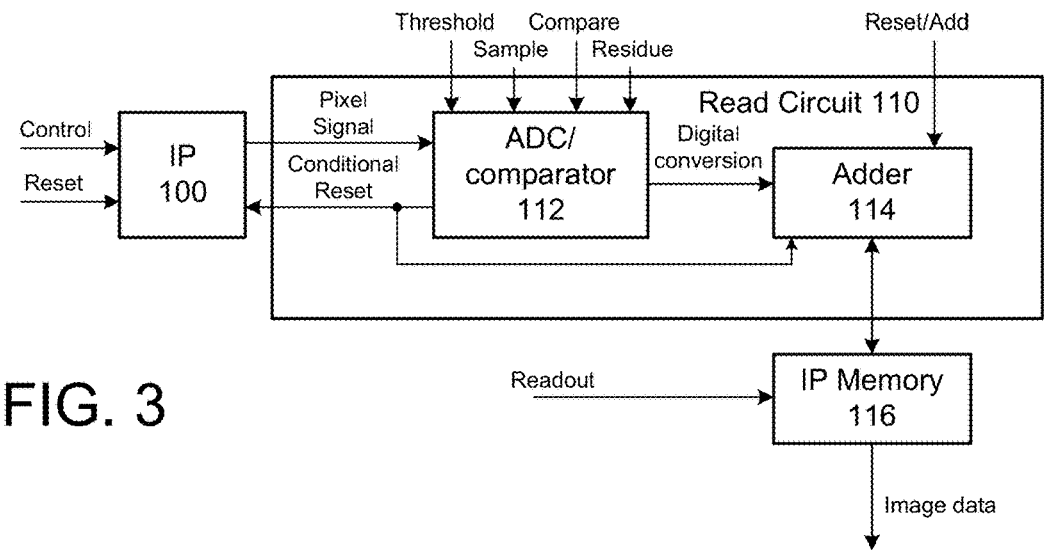
FIG. 3 illustrates an example image sensor read circuit configured to convert a pixel signal into a multi-bit digital conversion, according to one embodiment useful, e.g., with the embodiments of FIGS. 1 and 2.

In some image sensors, electrical information representing a photon response and resulting from light incident upon a pixel region (referred to herein as a "pixel signal") is converted to a digital image data value by read circuitry. The read circuitry can reside within the image sensor, or can be located external to the image sensor. In some approaches, a read circuit can be located within the image sensor for use by one or more pixel regions adjacent or near the read circuit. For read circuits located external to the image sensor, the pixel signals of one or more pixel regions associated with the read circuits can be transferred from the pixel regions to the read circuits.

Each read circuit samples a pixel region, receives a pixel signal from the sampled pixel region, and converts the pixel signal to a multi-bit digital value representative of the pixel signal. In the event that a pixel signal or a digital value representative of the pixel signal exceeds a sampling threshold, the pixel signal stored at the pixel region associated with the pixel signal is reset (for instance, by resetting a photosensitive element associated with the pixel region). If the pixel signal or the digital value do not exceed the sampling threshold, the pixel signal stored at the pixel region is not reset. The sampling of a pixel region and the resetting of a pixel signal at the pixel region only when the pixel signal exceeds a sampling threshold is referred to herein as "non-destructive sampling with conditional reset."

Image Sensor Overview

FIG. 1 illustrates a partial cross-section of an image sensor 25 useful in an embodiment. In image sensor 25, light passing through a microlens array 10 and a color filter array 12 (useful for color imaging) is incident upon a silicon section 20 of the image sensor. The use of microlenses (or other concentrating optics) and color filters is optional and is shown here for illustrative purposes only. Silicon 20 contains photodiodes (not shown) to collect charge generated by photons absorbed by the silicon, and access transistors (also not shown) to operate the photodiodes. Pixel array IC wiring 14 provides connections used to route signals and supply voltages within the array. As shown, image sensor 25 is a BackSide Illuminated (BSI) sensor because light enters the silicon from the side of the integrated circuit opposite the wiring layers and primary active circuit formation. Optionally, pixel array IC wiring 14 can be arranged between the color filter array 12 and silicon 20 (with primary active circuit formation within the "top" of the silicon as oriented in FIG. 1) for FrontSide Illumination (FSI).

The image sensor 25 includes a plurality of IPs ("image pixels"), IP1-IP3 shown, upon which light collected by the lenses of the microlens array 10 is respectively incident. Each IP includes one or more photodiodes embedded within the silicon 20. At least some photons entering silicon 20 are converted to electron-hole pairs in the silicon and the resulting electrons (or holes in alternate embodiments) are collected by the IPs. The description herein will refer to this process as the capture and conversion of light by the IPs into image data for the purposes of simplicity. Each IP of the image sensor represents a portion of the surface area of the image sensor, and the IPs of the image sensor may be organized into various arrays of columns and rows. In a CMOS or CCD image pixel technology, each IP (for instance, each photosensor) converts light incident upon the IP into a charge and includes readout circuitry configured to convert the charge into a voltage or current. In one embodiment, the light captured by each IP of the image sensor represents one pixel of image data for an associated digital image, though in other embodiments image data from multiple IPs is combined to represent a fewer number (one or more) of pixels (downscaling).

The image sensor 25 may include components outside the IP array. Similarly, portions of the IP array may include components that do not convert light into charge. The region defined by the IPs in the aggregate will be referred to as the image sensor region. As described herein, the image sensor may include amplifiers, analog-to-digital converters ("ADCs"), comparators, controllers, counters, accumulators, registers, transistors, photodiodes, and the like. In different architectures, some of these components may be located within the image sensor region or external to the image sensor region, and some components may be located on a companion integrated circuit. In these embodiments, a lens (such as those of the microlens array 10) may be configured to direct light toward the actual light-sensing elements within the IP rather than, for example, on the amplifiers, comparators, controllers, and other components.

As noted above, an image sensor may include an array of multiple IPs. Each IP, in response to light (for instance, one or more photons), captures and stores a corresponding charge. In one embodiment, upon sampling an IP, if a pixel signal representative of the charge stored at the IP exceeds a sampling threshold, the pixel signal is converted to a digital value representing the pixel signal and the charge stored by the IP is reset. Alternatively, upon sampling an IP, a pixel signal representative of the charge stored at the IP is converted to a digital value representative of the pixel signal, and if the digital value exceeds a sampling threshold, the charge stored by the IP is reset. In other embodiments, an analog-to-digital conversion is begun, and when enough of the conversion has been completed to determine whether the threshold is exceeded, a determination is made as to whether to continue the conversion. For instance, in a successive approximation register ("SAR") ADC, if the threshold is equal to a most-significant-bit(s) pattern, as soon as the pattern is resolved a determination can be made as to whether to continue the conversion and perform a reset of the pixel, or stop the conversion. A determination of whether a pixel signal or a digital value representative of a pixel signal exceeds a sampling threshold can be made through the use of a comparator configured to compare the pixel signal or the digital value to a sampling threshold.

FIG. 2 illustrates an analog pixel image sensor with multiple pixel signal thresholds, according to one embodiment. The image sensor of FIG. 2 is a CMOS sensor, and includes an IP array 40. The IP array can include any number of columns and rows, with any number of IPs per column and per row. IP column 50, a column representative of full or partial IP columns in the IP array, is highlighted in FIG. 2. The IP column 50 includes a plurality of IPs communicatively coupled via the column line 55. IP 60, an IP representative of IPs in the IP array, is highlighted in FIG. 2.

The IP 60 includes a photo diode 65 together with control elements that enable the photo diode to be precharged in preparation for exposure and then sampled after exposure. In operation, a transistor 70 is switched on to couple the cathode of the photo diode to a voltage source and thus "precharge" the cathode of the photo diode to a precharge voltage. The transistor 70 is switched off at or before the start of an exposure interval. With the transistor 70 off, the cathode voltage incrementally discharges in response to photon strikes, lowering the photo diode potential, VDET, in proportion to the amount of light detected. At the conclusion of the exposure interval, an access transistor 72 is switched on to enable a signal representative of the photo diode potential to be amplified/driven onto the column line 55 via follower-transistor 74 as pixel signal 80.

An ADC 85 is communicatively coupled to the IP column 50 via the column line 55. In the embodiment of FIG. 2, the ADC is located at the edge of the pixel array 40, and may be located within or external to the image sensor on which the IP array is located. The ADC receives the pixel signal 80 (the representation of the analog photo diode potential) from the IP 60. The ADC digitizes the pixel signal to generate a 3-bit digital value ("Pix[2:0]") representative of the pixel signal. The ADC includes 7 pixel thresholds, Threshold 1 to Threshold 7 (referred to herein as "VT1 to VT7"). If the magnitude of the pixel signal is less than Vpre but greater than VT1, the ADC converts the pixel signal to the digital value "000". Pixel signals less than VT1 but greater than VT2 are converted to the digital value "001", pixel signals between VT2 and VT3 are converted to "010", and so forth, up to pixel signals less than VT7, which are converted to "111".

In the embodiment of FIG. 2, the potential difference between successive pixel thresholds is approximately the same (e.g., VT3−VT4≈VT5−VT6). In other words, the pixel thresholds are linearly distributed between VT1 and VT7. In addition, in the embodiment of FIG. 2, the potential difference between Vpre and VT1 is greater than the potential difference between successive pixel thresholds (e.g., Vpre−VT1>VT3−VT4), although in other embodiments all steps are equal. The selection of VT1 such that Vpre−VT1>VT3−VT4 reduces the effect of, e.g., dark noise when sampling an IP. The potential difference between VT7 and Vfloor in the embodiment of FIG. 2 also can be greater than the potential difference between successive pixel thresholds (e.g., VT7−Vfloor>VT3−VT4). Finally, instead of linear threshold spacing, a given embodiment can space the thresholds exponentially, e.g., with each threshold spacing doubling from the one below. For systems that accumulate multiple ADC samples to form an image, exponential spacing is converted to a linear value prior to accumulation.

Vfloor represents the pixel saturation threshold at which the cathode voltage of the photo diode 65 no longer linearly discharges in response to photon strikes. For pixel signals within the linear sensitivity region 90, the conversion of pixel signals to digital values is shown in graph 95. It should be noted that the maximum number of detectable photon strikes (i.e., the pixel saturation point) is proportional to the capacitance of the photo diode and thus its physical size. Consequently, in a traditional sensor design the photo diode footprint is dictated by the dynamic range required in a given application and does not scale appreciably with shrinking process geometries.

During the capture of an image, in one embodiment the IPs of a given row or rows in the IP column 50 and each other column in the IP array 40 are successively sampled and the pixel signals associated with each are converted into digital values using the ADC or ADCs associated with each column. The digital values output by the ADCs are accumulated (conditionally in some embodiments, as explained below) and stored during the image capture period. Other types and configurations of IPs than that illustrated in FIG. 2 can be used in the image sensor system. For instance, a different arrangement of transistors can be used than the transistors 70, 72, and 74. In addition, although one ADC 85 is shown in FIG. 2 in conjunction with the IP column 50, in other embodiments, more than one ADC can be used per IP column, with different ADC groups serving different sections of the array rows of the ADC column. Additional combinations of ADCs (in the form of read circuits) and IPs are described below in greater detail. Finally, the output of the ADC (e.g. Pix[2:0] in the embodiment of FIG. 2) can be any multi-bit length, and can be associated with any number of thresholds distributed in any manner between $V_{pre}$ and $V_{floor}$.

Image Sensor System with Multi-bit Sampling and Conditional Reset

FIG. 3 illustrates an example image sensor read circuit configured to convert a pixel signal into a multi-bit digital conversion, according to one embodiment. The embodiment of FIG. 3 illustrates an IP 100, an IP memory 116, and a read circuit 110, the read circuit including an ADC/comparator circuit 112 (hereinafter "ADC/comparator") and an adder 114. It should be noted that in other embodiments, the modules of FIG. 3 can include additional, fewer, and/or different components. For example, the ADC/comparator can be implemented as separate components, and the adder can be located external to the read circuit.

The IP 100 represents an IP in an image sensor, and can be, for instance, the IP 60 of FIG. 2. The IP 100 receives one or more control signals, for instance from external control logic. A control signal can enable the IP to begin an image capture, for instance by resetting the IP to Vpre and enabling the exposure of the IP's photosensitive element to light to result in the storing of charge relative to Vpre. Similarly, a control signal can enable the IP to end an image capture, for instance by disabling the exposure of the IP's photosensitive element to light after the passing of an image capture period. A control signal can also enable the outputting of a pixel signal by an IP and the subsequent conversion of the pixel signal to a digital value representative of the pixel signal by a read circuit (referred to herein as "sampling the IP" or "sampling the pixel signals"). As described above, a pixel signal can be a representation of the integrated charge (e.g., a source follower voltage, an amplified voltage, or a current having a component proportional to the integrated charge).

The IP 100 receives a reset signal, for instance from external control logic. The reset signal resets the charge stored by the IP to Vpre, for instance at the beginning of an image capture period. The IP also receives a conditional reset signal from the ADC/comparator 112 (in some circuits, the conditional reset and initial reset are supplied using common circuitry). The conditional reset signal resets the charge stored by the IP, for instance during an image capture period in response to a pixel signal exceeding a sampling threshold when the IP is sampled. It should be noted that in other embodiments, the conditional reset signal is received from a different entity. In one implementation, the ADC/comparator may determine that the pixel signal exceeds a sampling threshold, and may enable external control logic to output a conditional reset signal to the IP; in such an embodiment, the reset signal (a row-wise signal) and the conditional reset signal (a column-wise signal) may be ANDed by the IP to initiate all resets. For simplicity, the remainder of the description will be limited to embodiments in which the ADC/comparator provides conditional reset signals to the IP.

The read circuit 110 receives a threshold signal, a sample signal (or "sample enable signal"), a compare signal (or "compare enable signal"), a residue signal (or "residue enable signal"), and a reset signal, for instance from external control logic, and receives pixel signals from the IP 100. The IP memory element 116 corresponding to IP 100 receives a readout signal that selects it for readout/write by adder 114 and for external readout. The ADC/comparator 112 samples the IP 100 in response to receiving one or more sample signals. During an image capture, the ADC/comparator receives a sample signal at various sampling intervals, for instance periodically or according to a pre-defined sampling interval pattern (referred to herein as a "sampling policy"). Alternatively, the sample signal received by the ADC/comparator can include a sampling policy, and the ADC/comparator can be configured to sample the IP based on the sampling policy. In other embodiments, the IP receives one or more sample signals and outputs pixel signals based on the received sample signals. In yet other embodiments, the IP outputs pixel signals periodically or according to a sampling policy, or the ADC/comparator samples pixel signals periodically or according to a sampling policy, independent of received sample signals. The ADC/comparator can request a pixel signal from the IP prior to sampling the pixel signal from the IP.

During a sampling of the IP, the ADC/comparator 112 receives a pixel signal from the IP and converts (optionally in some embodiments based on the pixel signal exceeding the sampling threshold) the pixel signal to a multiple-bit digital value representative of the pixel signal. If the pixel signal exceeds a sampling threshold, the ADC/comparator outputs a conditional reset signal to reset the charge stored at the IP. If the pixel signal does not exceed a sampling threshold, the ADC/comparator does not output a conditional reset signal to reset the charge stored at the IP. The sampling threshold can be varied during the image capture and received via the threshold signal, or can be pre-determined or preset for a given image capture. One sampling threshold can be used during multiple image captures, different sampling thresholds can be used for different image captures, and multiple sampling thresholds can be used during a single image capture. In one embodiment, the sampling threshold varies in response to detected changing light conditions (for instance, the sampling threshold can decrease in response to low light conditions, and can increase in response to high light conditions).

In one embodiment, the sampling threshold is an analog signal threshold. In this embodiment, the ADC/comparator 112 includes an analog comparator and compares the pixel signal to the sampling threshold to determine if the pixel signal exceeds the sampling threshold. If the pixel signal includes a voltage representative of the charge stored by the IP 100, the sampling threshold is exceeded if the pixel signal is lower than the sampling threshold. Using the embodiment of FIG. 2 as an example, if the sampling threshold of the ADC/comparator is Threshold 4, then the pixel signal will exceed the sampling threshold only if the pixel signal includes a voltage lower than the voltage associated with Threshold 4.

In one embodiment, the sampling threshold is a digital signal threshold. In this embodiment, the ADC/comparator 112 includes a digital comparator, and first converts the pixel signal to a digital value representative of the pixel signal. The ADC/comparator then compares the digital value to the sampling threshold to determine if the pixel signal exceeds the sampling threshold. Using the embodiment of FIG. 2 as an example, for a sampling threshold of "101", if the ADC/comparator converts a pixel signal to a digital value of "001" (indicating that the pixel signal is between Threshold 1 and Threshold 2), then the pixel signal does not exceed the sampling threshold and a conditional reset signal is not outputted. However, if the ADC/comparator converts a pixel signal to a digital value of "110" (indicating that the pixel signal is between Threshold 6 and Threshold 7), then the pixel signal does exceed the sampling threshold and a conditional reset signal is outputted.

In another embodiment, the sampling threshold is a digital signal threshold that can be evaluated prior to the complete digital conversion of the pixel signal. This can be advantageous in some embodiments or use cases to allow faster conditional reset of a pixel, and/or power savings by avoiding unneeded ADC operations. For instance, with a successive approximation register ADC, multiple clock cycles are used to resolve the digital representation of the pixel signal. The first clock cycle resolves the most significant bit, the second clock cycle the next most significant bit, etc., until all bit positions have been resolved. Using the embodiment of FIG. 2 as an example, for a sampling threshold of "100," a determination of whether the threshold is met or not can be resolved after the first SAR ADC clock cycle. For a sampling threshold of "110," a determination of whether the threshold is met or not can be resolved after the second SAR ADC clock cycle. For embodiments with a bit depth of, e.g., 6 or 8 bits, making a reset determination after one or two conversion cycles can result in significant time/power savings, which can be realized by selecting a sampling threshold with one or more LSBs that are 0.

In one embodiment, a row-wise compare signal is supplied to each ADC/comparator "compare" signal input, and signals the ADC/comparator as to the appropriate clock cycle to perform the comparison. When the compare signal is asserted, the comparison is performed based on the current state of the analog-to-digital conversion. If the threshold is met by the compare for ADC/comparator 112, the conditional reset signal is asserted to IP 100 and to adder 114, and the SAR ADC continues converting the pixel signal. If the threshold is not met, the conditional reset signal is not asserted, and can be used in conjunction with the compare signal to gate the clock signal of SAR ADC to terminate the conversion.

The ADC/comparator 112 outputs a digital value representative of a pixel signal received by the ADC/comparator (referred to herein as a "digital conversion") to the adder 114. The ADC/comparator 112 can output a digital conversion in response to the pixel signal associated with the digital conversion exceeding a sampling threshold. The conditional reset signal can be used as an enable to signal to the adder 114 to load the digital conversion and add it to the IP memory 116 location corresponding to IP 100 (which in this embodiment is selected from a plurality of such locations by address selection of the readout line). In other embodiments, the ADC/comparator outputs a digital conversion during each sampling of the IP 100, regardless of whether the pixel signal associated with the digital conversion exceeds a sampling threshold. In these embodiments, the adder can be configured to accumulate digital conversions associated with pixel signals that exceed a sampling threshold and to disregard digital conversions associated with pixel signals that do not exceed a sampling threshold. Alternately, if the threshold is set to "001" in FIG. 2, for example, the adder can unconditionally add the digital conversion to IP memory 116 each time IP 100 is read, while still producing correct results.

In one embodiment, the ADC/comparator 112 also outputs a digital conversion in response to receiving a residue signal assertion (without the compare signal being asserted). The residue signal assertion is associated with the end of an image capture, and enables the ADC/comparator to output a full digital conversion to the adder 114 regardless of whether the pixel signal associated with the digital conversion exceeds a sampling threshold, and asserts the conditional reset. The residue signal can prevent the loss of image information associated with light received by the IP 100 but not surpassing the threshold at the end of a capture period. If the pixel signal representative of such received light does not exceed the sampling threshold, the ADC/comparator otherwise may not output the digital conversion associated with the pixel signal, and the charge stored by the IP would not be reset by the conditional reset signal (which is also triggered by assertion of the residue signal). In embodiments where the ADC/comparator outputs digital conversions to the adder regardless of whether the pixel signals associated with the digital conversions exceed a sampling threshold, the adder can receive the residue signal, and can be configured to accumulate a digital conversion associated with a pixel signal received at the end of a capture period in response to receiving the signal.

The adder 114 is configured to accumulate digital conversions received during a capture period. As discussed above, in embodiments in which the ADC/comparator 112 outputs digital conversions only if the pixel signals associated with the digital conversions exceed a sampling threshold, the adder accumulates all received digital conversions (including the additional digital conversion output by the ADC/comparator in response to receiving a residue signal) into IP memory 116. In embodiments in which the ADC/comparator outputs digital conversions associated with each received pixel signal, the adder accumulates only the digital conversions associated with pixel signals that exceed the sampling threshold, plus the digital conversion output by the ADC/comparator in response to receive a residue signal, into IP memory 116; such embodiments require the adder to be aware of when pixel signals exceed a sampling threshold and when a residue signal is received, and are not discussed further herein for the purpose of simplicity.

The adder 114 receives reset/add control signaling, for instance from external control logic. In response to receiving a reset signal (for instance at the beginning of an image capture period), the accumulator stores all zeros to the selected IP memory location 116 the accumulation of received digital conversions as image data. The adder also receives a reset signal and resets the accumulation of received digital conversions.

In alternative embodiments, the adder is located external to the read circuit 110. For instance, the ADC/comparator can output a stream of conversions to a digital channel (e.g., multiplexed with other conversions from other ADCs) to a separate circuit that supplies the accumulation function. In such a case, the ADC/comparator must also output a symbol for "no conversion," which can be 0. One possibility is for a circuit in the digital channel interface (e.g., PHY 134 in FIG. 4) to code digital conversions to reduce bandwidth. A "no conversion" in one embodiment is output as a "00," a upper threshold exceeded ADC conversion is output as a "01," and all other ADC conversions are output as "1xxxxxx," where an x represents one of the resolved bits of the ADC conversion and the number of x positions is equal to the bit depth of the ADC.

In one embodiment, the IP is configured to output a pixel signal and receive a conditional reset on the same line. In this embodiment, the IP and the ADC/comparator 112 alternately drive the pixel signal and the conditional reset on the shared line. For example, the IP can output a pixel signal on the shared line during a first portion of a sample period, and can receive conditional resets on the shared line during a second portion of a sample period. Finally, the ADC/comparator can receive a threshold signal, a sample signal, and a residue signal on a shared line. For example, the ADC/comparator can receive a threshold signal at the beginning of an image capture, can receive sample signals throughout the image capture period, and can receive a residue signal at the end of the image capture period. It should also be noted that the reset signal received by the IP can be the same reset signal received by the accumulator 114, and can be received on a shared line.

Figure 4:
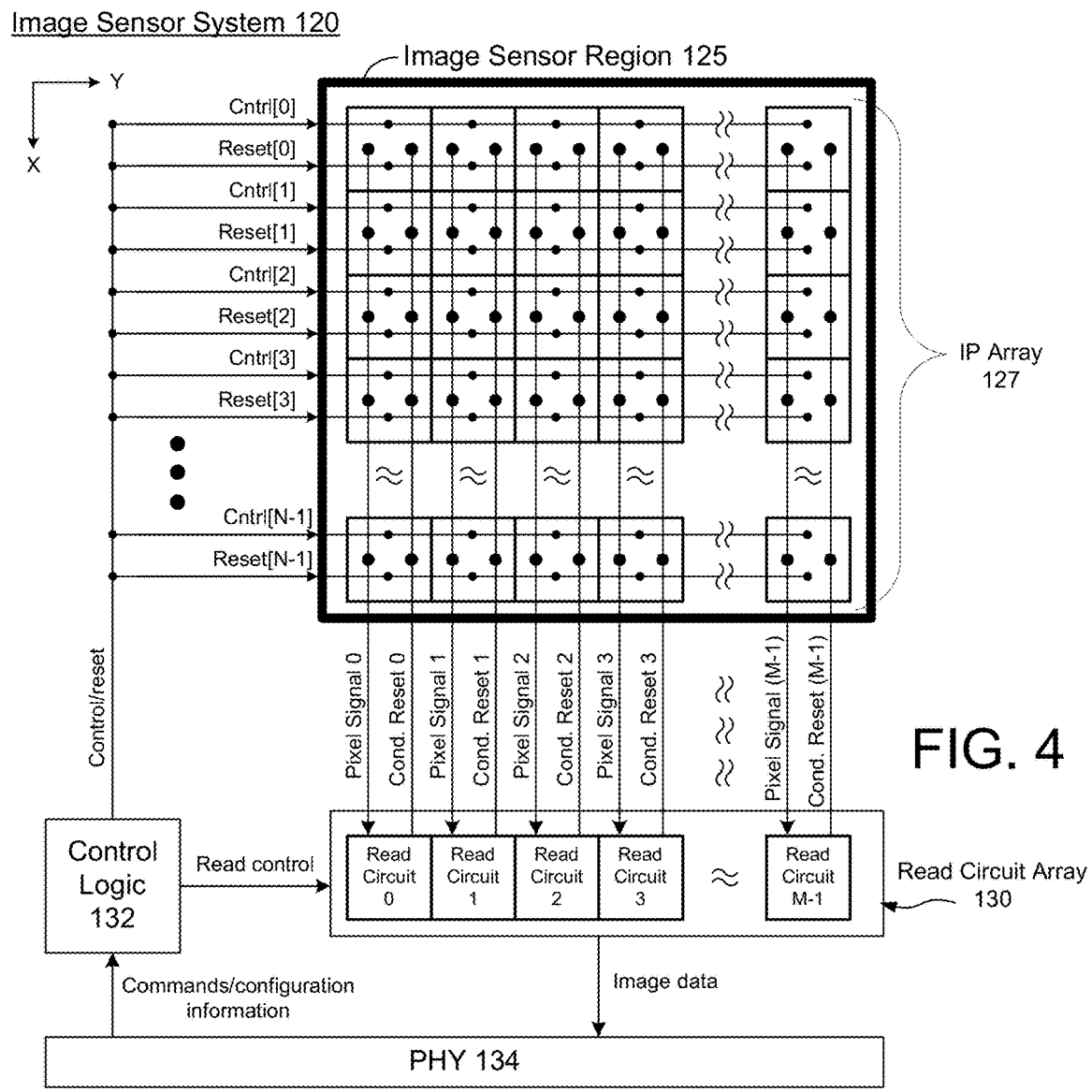
FIG. 4 illustrates an example circuit block diagram embodiment of an image sensor system with a multi-bit architecture, according to one embodiment using, e.g., the cross-section of FIG. 1 and the circuitry of FIGS. 2 and 3.

FIG. 4 illustrates an example embodiment of an image sensor system with a multi-bit architecture, according to one embodiment. The image sensor system 120 of FIG. 4 includes an image sensor region 125, a read circuit array 130, control logic 132, and a physical signaling interface 134. In other embodiments, the image sensor system may include fewer, additional, or different components than illustrated in the embodiment of FIG. 4 (for instance, the circuit may have memory 116 integrated therewith). The image sensor system shown in FIG. 4 can be implemented as a single IC, or can be implemented as multiple ICs (for instance, the image sensor region and the read circuit array can be located on separate ICs). Further, various components (such as the read circuit array, the control logic, and the physical signaling interface) can be integrated within the image sensor region 125.

For purposes of example, the image sensor system 120 and a host IC (not shown in FIG. 4) communicatively coupled to the image sensor system are assumed to form the primary image acquisition components within a camera (e.g., a still-image or video camera within a mobile device, compact camera, digital SLR camera, stand-alone or platform-integrated webcam, high-definition video camera, security camera, automotive camera, etc.). The image sensor IC and host IC can be more generally deployed alone or together with like or different imaging components within virtually any imaging system or device including without limitation metrology instruments, medical instruments, gaming systems or other consumer electronics devices, military and industrial imaging systems, transportation-related systems, space-based imaging systems and so forth. Operation of the image sensor system generally involves the capture of an image or frame through the exposure of IPs to light, the conversion of stored charge as a result of the exposure into image data, and the outputting of the image data to a storage medium.

The image sensor region 125 includes an IP array 127 including N-rows (indexed from 0 to N−1) and M-columns (indexed from 0 to M−1). The physical signaling interface 134 is configured to receive commands and configuration information from a host IC (e.g., a general-purpose or special-purpose processor, application-specific integrated circuit (ASIC) or any other control component configured to control the image sensor IC), and is configured to provide the received commands and configuration information to the control logic 132. The physical signaling interface is also configured to receive image data from the read circuit array 130 and to output received image data to the host IC.

The control logic 132 is configured to receive commands and configuration information from the physical signaling interface 134, and is configured to transmit signals configured to manipulate the operations and functionality of the image sensor system 120. For example, in response to receiving a command to capture an image or frame, the control logic may output a series of exposure signals (configured to cause IPs to reset) and sample signals (configured to cause the read circuits in the read circuit array 130 to sample the pixel signals from the IPs in the IP array 127), enabling the capture of the image or frame by the image sensor system. Similarly, in response to receiving a command to initialize or reset the image sensor system, the control logic may output reset signals configured to reset each IP in the IP array, causing each IP to disregard any accumulated charge. The control signals produced by the control logic identify particular IPs within the IP array for sampling, may control the functionality of read circuits associated with IPs, or may control any other functionality associated with the image sensor system. The control logic is shown in FIG. 4 as external to the image sensor region 125, but as noted above, all or portions of the control logic may be implemented locally within the image sensor region.

The control logic 132 outputs control and reset signals for each IP in the image sensor region 125. As illustrated in the embodiment of FIG. 4, each IP in an image pixel IP[X][Y] receives a row-parallel Cntrl[X] signal (corresponding to a "row" select control signal for each IP) and a row-parallel Reset[X] signal from the control logic to reset the IPs, wherein "X" and "Y" refer to the coordinates of the IP within the image sensor region. Although the control signal and reset signals received at any given IP are each only 1 bit as indexed in the embodiment of FIG. 4, it is to be appreciated that such an indexing is done for the purposes of simplicity only, and that these signals may in practice be any width or dimension.

The read circuit array 130 includes M read circuits, each configured to receive pixel signals from a column of IPs in the IP array 127. It should be noted that in other embodiments, the read circuit array can include multiple read circuits configured to receive pixel signals from each IP column, as is discussed in FIGS. 5a, 5b, and 5c. A pixel signal bus couples the IPs in each IP column in the IP array to the read circuit associated with the IP column within the read circuit array. Each IP is configured to output a pixel signal produced by the IP to the pixel signal bus, and each read circuit is configured to sample the pixel signals from the IPs in the IP column associated with the read circuit. For example, read circuit 0 is configured to sample pixel signals from pixel signal bus 0, and so forth. Each read circuit in the read circuit array can sample pixel signals iteratively from IPs in the IP column associated with the read circuit (for instance, by sampling pixel signals from successive IPs in order over multiple passes), or can sample pixel signals according to a pre-determined non-sequential order. In one embodiment, read circuits can sample multiple pixel signals simultaneously. Although not illustrated in the embodiments of FIG. 3 and FIG. 4, the read circuits can additionally include memories configured to store accumulated digital values prior to outputting the accumulated values as image data.

A conditional reset bus couples the IPs in each IP column in the IP array 127 to the read circuit associated with each IP column. After sampling a pixel signal from an IP in an IP column, the read circuit associated with the IP column produces a conditional reset signal if the sampled pixel signal exceeds a sampling threshold. For example, if an IP in an IP column outputs a pixel signal to a read circuit associated with the IP column via the pixel signal bus coupling the IP to the read circuit, and if the read circuit determines that the pixel signal exceeds a sampling threshold, the read circuit outputs a conditional reset signal to the IP via the conditional reset bus coupling the read circuit to the IP and the IP resets the charge stored at the IP. As described above, the pixel signal bus and the conditional reset bus can be implemented in a shared bus with Cntrl[X] enabling pixel signals to be output from row X to the shared bus and Reset[X] enabling conditional reset for pixels in row X from the shared bus, though such embodiments are not described further herein for the purposes of simplicity.

The control logic 132 produces read control signals for the read circuits in the read circuit array 130. The read control signals can control the sampling of pixel signals from the IPs in the IP array 127 by the read circuits, the conversion of sampled pixel signals into digital values, the accumulation of the digital values, the outputting of the accumulated digital values, and the resetting of the adders. The read control signals can include a threshold signal, a sample signal, a compare signal, a residue signal, a readout signal, and a reset/add signal for each read circuit in the read circuit array as described in FIG. 3.

The control logic 132 is configured to produce read control signals for the read circuit array 130 to enable the capture of an image over an image capture period. Prior to the image capture period or at the first use of a particular IP memory location for an image capture period, the control logic can produce a reset to cause the accumulator of each read circuit 110 to reset the IP memory location. At the beginning of the image capture period, the control logic can produce a threshold signal for each of the read circuits; as discussed above, the threshold signal is used by each read circuit to determine a threshold to which pixel signals are compared for the purposes of conditionally resetting IPs associated with the pixel signals and accumulating digital values associated with the pixel signals. During the image capture period, the control logic can produce a series of sample signals configured to enable the read circuits to sample pixel signals from IPs associated with the read circuits. In one embodiment, the control logic produces sample signals according to one or more sampling policies. Sampling policies are described in greater detail below. At the end of the image capture period, the controlled logic produces a residue signal configured to enable each read circuit to accumulate a digital value representative of a pixel signal regardless of whether the pixel signal exceeds a sampling threshold. After the image capture period, the control logic produces a readout signal configured to enable each read circuit to output the accumulated digital values representative of sampled pixel signals that exceed an associated sampling threshold as image data. The control logic may also produce a reset signal after each image capture period to reset the accumulated digital values within each read circuit.

The control logic may also be configured to produce pause and resume signals configured to cause the IPs and the read circuits to pause and resume an image capture, and to produce any other signal necessary to control the functionality of the IPs and read circuits in the read circuit array. For each read circuit, the image data output by the read circuit is a digital representation of the light captured by each IP in an IP column associated with the read circuit. The image data is received by the physical signaling interface for subsequent output to a host IC.

Figure 5:
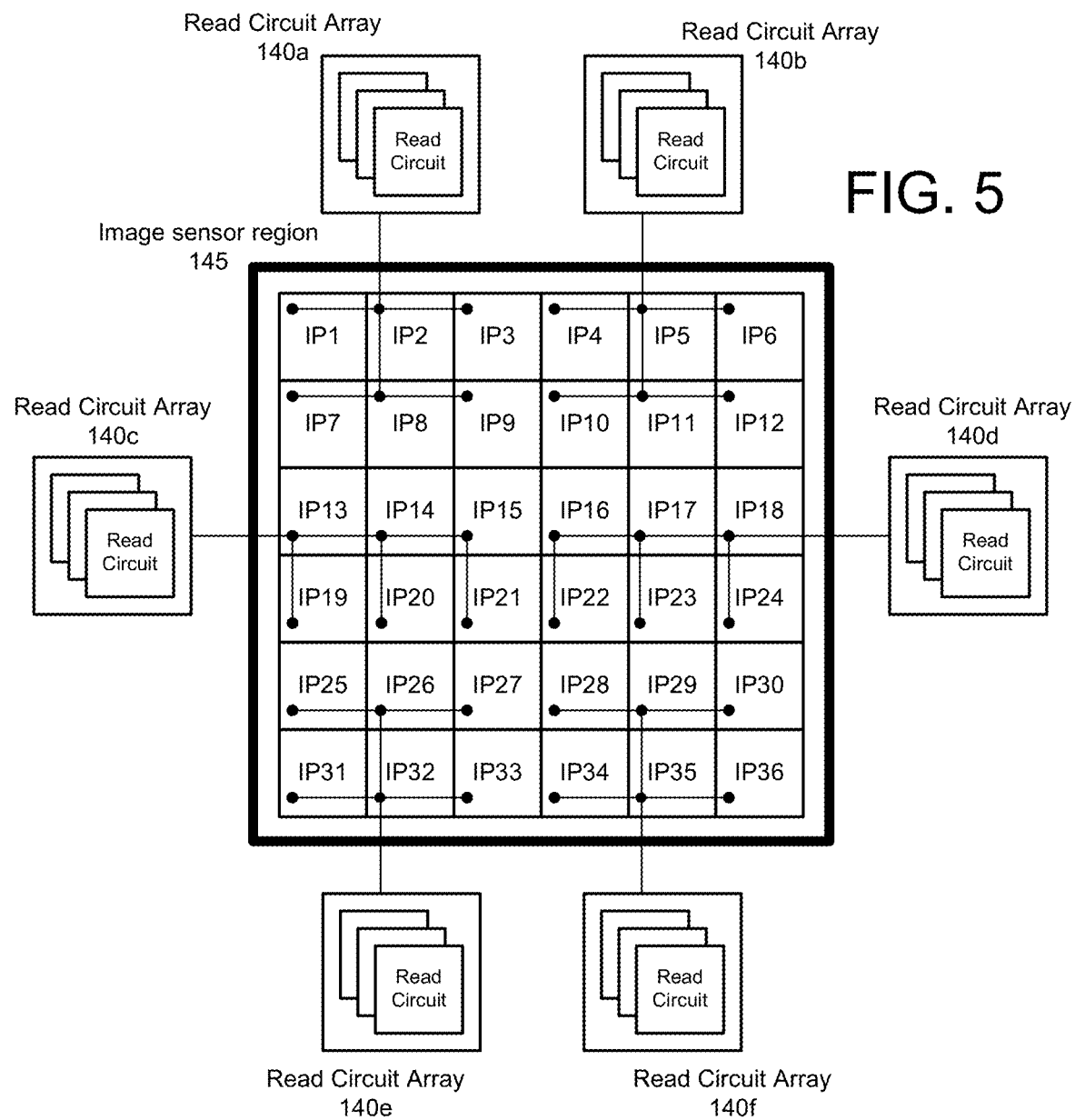
FIG. 5 illustrates another example circuit block diagram of an image sensor system architecture with read circuit arrays located peripherally to an IP array, according to one embodiment using, e.g., the cross-section of FIG. 1 and the circuitry of FIGS. 2 and 3.

FIG. 5 illustrates an example image sensor system architecture with read circuit arrays located peripherally to an IP array, according to one embodiment. In the architecture of FIG. 5, six read circuit arrays (140a, 140b, 140c, 140d, 140e, and 140f) are located around an image sensor region 145 including an IP array. Unlike the embodiment of FIG. 4, in which one read circuit array 130 is located to one side of the image sensor region 125, the read circuit arrays 140 of FIG. 5 are located on all sides of the image sensor region 145. The read circuit arrays can be located within an IC also containing the image sensor region, or can be located on one or more separate ICs. For example, each read circuit array could be located on the periphery of an image sensor IC, or could be located in dedicated read circuit array ICs located adjacent to the image sensor IC.

In the previous embodiment of FIG. 4, each read circuit in the read circuit array 130 is coupled to an IP column in the IP array 127. In the embodiment of FIG. 5, each read circuit array 140x is coupled to a set of six IPs from partial rows and partial columns of the image sensor region 145. For example, read circuit array 140a is coupled to IP1, IP2, IP3, IP7, IP8, and IP9. Each read circuit array 140x includes one or more read circuits. In one embodiment, each read circuit array includes 6 read circuits, with each read circuit in a read circuit array coupled to one IP. In such an embodiment, each read circuit samples only the IP to which it is coupled. More typically, each read circuit will be shared by a block of IPs comprising a large number of rows and one or more columns. Although control logic is not illustrated in the embodiment of FIG. 5, each read circuit array can be coupled to universal control logic, or each may be coupled to dedicated control logic. Further, although a physical signaling interface is not illustrated in the embodiment of FIG. 5, each read circuit array may output image data via a common bus to a common physical signaling interface, or may output image data via a dedicated bus to a dedicated physical signaling interface coupled to each read circuit array.

Figure 6A:
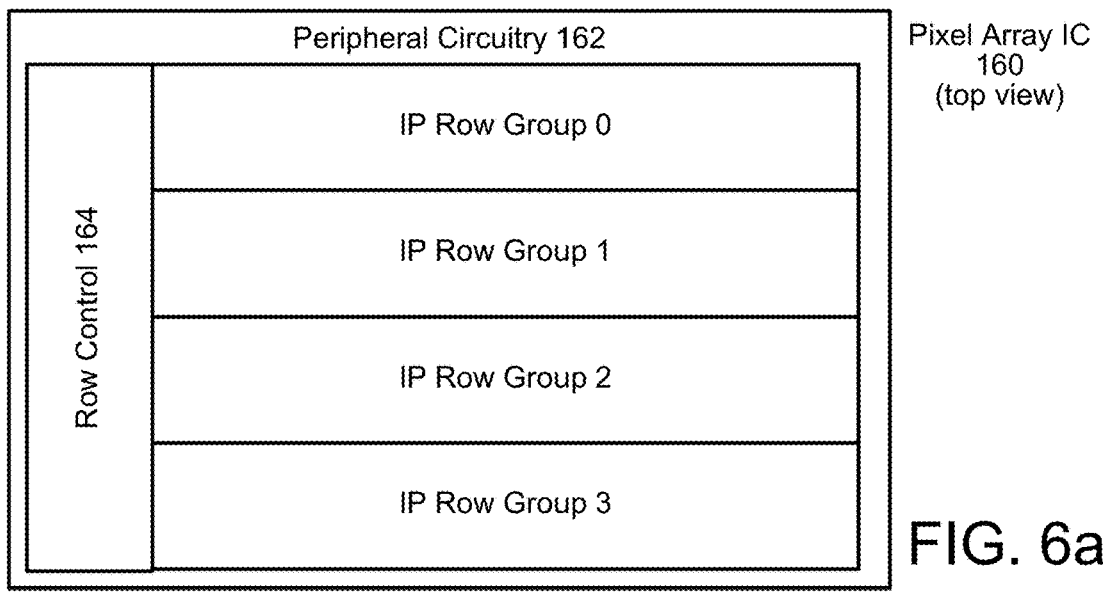
FIG. 6a illustrates a top view of a pixel array IC in an example two-layer image sensor system architecture alternative to FIGS. 4 and 5, according to one embodiment using, e.g., the array circuitry of FIG. 2.

FIG. 6a illustrates a top view of a pixel array IC in an example two-layer image sensor system architecture, according to one embodiment. The pixel array IC of FIG. 6a includes peripheral circuitry 162 surrounding an IP array. The IP array includes row control circuitry 164 and four row groups of IPs (IP Row Groups 0 through 3). Each IP row group is the width of the array and includes one-fourth of the rows in the array, and the row control circuitry provides control and reset signals needed for operation of the IPs (for instance, signals configured to cause the IPs to be enabled for reset and selected for readout, and any other signals discussed herein).

Figure 6B:
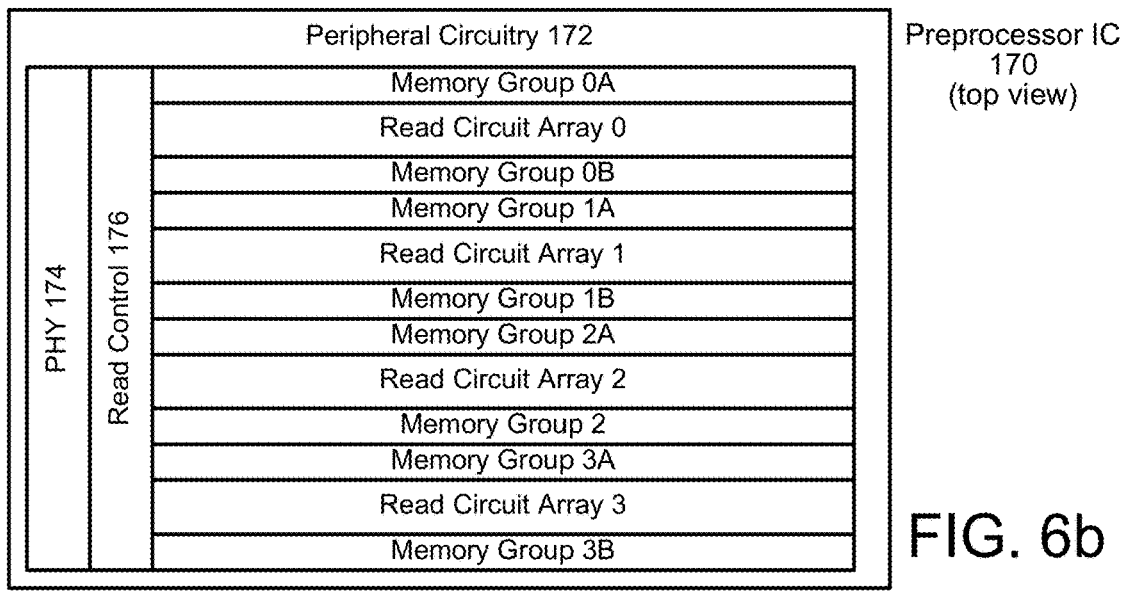
FIG. 6b illustrates a top view of a preprocessor IC in an example two-layer image sensor system architecture alternative to FIGS. 4 and 5, according to one embodiment using, e.g., the read circuitry of FIG. 3.

FIG. 6b illustrates a top view of a preprocessor IC in an example two-layer image sensor system architecture, according to one embodiment. The preprocessor IC of FIG. 6b includes peripheral circuitry 172 surrounding a read circuit array. The read circuit array includes a physical signaling interface 175 (which may alternately be on pixel array IC 160), read control circuitry 176, four read circuit arrays (read circuit array 0 through 3), and accompanying memory groups 0A/B, 1A/B, 2A/B, and 3A/B. Each read circuit array includes one or more read circuits (including an ADC, adder, and reset logic for each IP column) connected to corresponding rows in an associated memory group. When a particular IP row is selected in an IP row group of the pixel array IC, a corresponding row in the corresponding memory group is selected on the preprocessor IC.

Figure 6C:
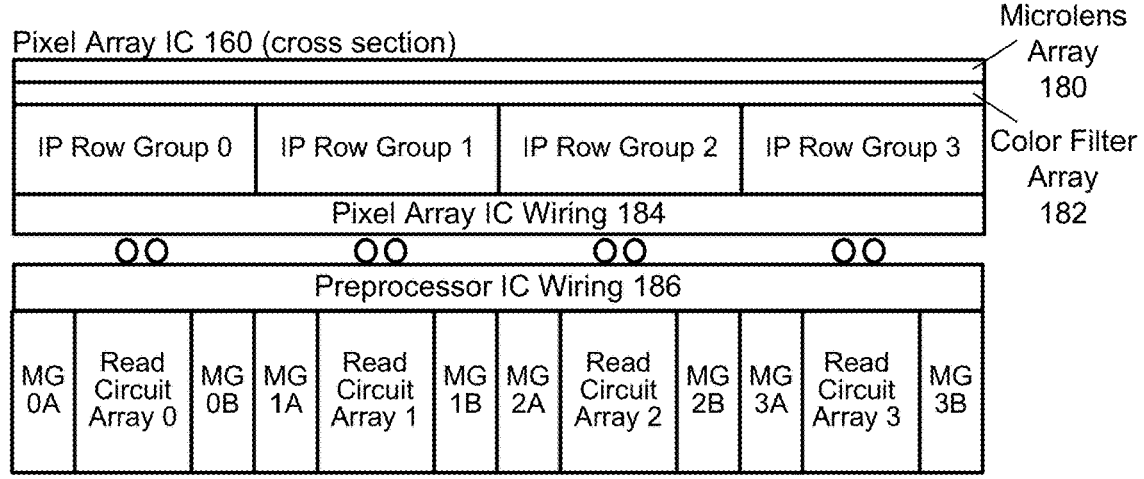
FIG. 6c illustrates a partial cross section of the pixel array IC of FIG. 6a and the preprocessor IC of FIG. 6b in an example two-layer image sensor system architecture, according to one embodiment.

FIG. 6c illustrates a cross section of the pixel array IC of FIG. 6a and the preprocessor IC of FIG. 6b in an example two-layer image sensor system architecture, according to one embodiment. In the embodiment of FIG. 6c, the pixel array IC 160 is located above the preprocessor IC 170 such that the bottom surface of the pixel array IC is coupled to the top surface of the preprocessor IC. A microlens array 180 and a color filter array 182 are located above the pixel array IC. The pixel array IC and the processor IC are coupled via pixel array IC wiring 184 and preprocessor IC wiring 186. By locating the pixel array IC above the preprocessor IC, the die size and percentage of surface area in the image sensor system capable of capturing light is increased. For instance, in a single-layer IC architecture including an IP array and one or more read circuit arrays, the portion of the single-layer IC including the one or more read circuit arrays are incapable of capturing light; such an embodiment reduces the percentage of silicon die used to capture light incident upon the single-layer IC. This requires the camera module footprint to be larger than the lens and the imaging array, and increases the cost and size of the camera module. The top-layer of the embodiment of FIG. 6c, in contrast, does not include read circuit arrays, so the die size of the top single layer IC is reduced to approximately the size of the IP array. Light incident upon the top-layer passes through the microlens array and the color filter array, is captured by the IPs in the IP array, and signals representative of the captured light are sampled by the read circuit arrays via the pixel array IC wiring and the preprocessor IC wiring.

Figures 7, 8, 9:
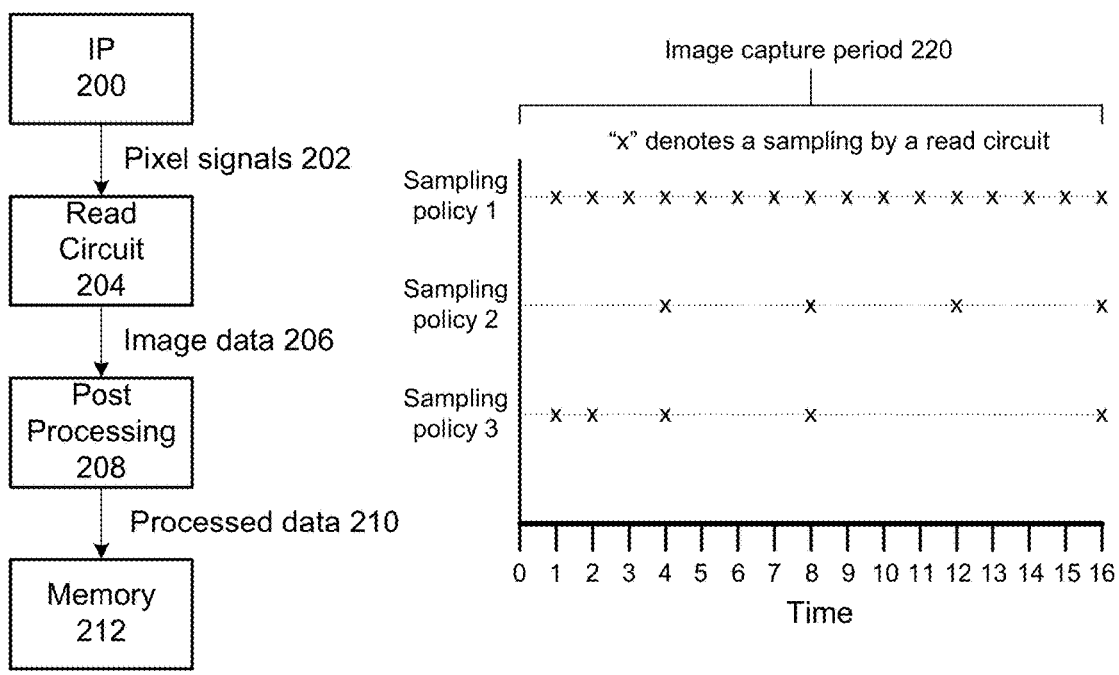
FIG. 7 illustrates the operation of an image sensor read circuit, such as the read circuit of FIG. 3, according to one embodiment.
FIG. 8 illustrates data flow in an image capture system, according to one embodiment useful with the systems described herein.
FIG. 9 illustrates various temporal sampling policies for use by an image sensor read circuit, such as the read circuit of FIG. 3, according to one embodiment.

FIG. 7 illustrates the operation of an image sensor read circuit, such as the read circuit of FIG. 3, according to one embodiment. In the example embodiment of FIG. 7, an image is captured over the course of 16 sampling intervals. The ADC of the example embodiment of FIG. 7 converts pixel signals to 5-bit digital values, and the accumulator accumulates 5-bit digital values into a 9-bit digital value during the image capture period. Further, in the embodiment of FIG. 7, the ADC converts received pixel signals into digital values representing the pixel signals such that each additional photon detected by an IP results in an increase in the digital value by one. For example, if an IP detects 5 photons after being reset, the pixel signal produced by the IP will be converted by the ADC into the value "00101". It should be emphasized that in other embodiments, the ADC converts received pixel signals into digital values representing the pixel signals such that multiple additional photons detected by an IP results in an increase in the digital value by one. In the embodiment of FIG. 7, pixel signals are analog voltages, and thus aren't shown in FIG. 7 for the purposes of simplicity.

At the beginning of the image capture period (sampling interval 0), a control signal is received configured to configure an IP of the read circuit to be reset and begin exposure. In the embodiment of FIG. 7, the "begin exposure" control signal also resets the value stored at the memory element corresponding to the IP to zero. In addition, a threshold signal is received to set the sampling threshold for the read circuit at a pixel signal equivalent to 20 photons.

During the first sampling interval, 4 photons are detected by the IP. The IP then produces a pixel signal representing the charge collected by a photosensitive element within the IP equivalent in response to detecting the 4 photons, and the ADC converts this pixel signal to the digital value "00100". Since the 4 detected photons do not trigger the sampling interval of 20 photons ("10100"), the accumulator does not accumulate the digital value "00100", and the charge stored by the IP is not dissipated (the IP is not reset). Note that the column "Photons (det.-accum.)" indicates first the number of photons detected by the IP during a particular sampling interval and second the number of accumulated photons since the last conditional reset of the IP.

During sampling interval 2, 7 additional photons are detected by the IP. The charge stored by the IP increases from the charge produced in response to detecting 4 photons during sampling interval 1 to a charge produced in response to detecting 11 accumulated photons (4 photons during sampling interval 1 and 7 photons during sampling interval 2). The pixel signal produced by the IP in response to the stored charge is converted to the digital value "01011". Since the total 11 photons do not trigger the sampling threshold of 20 photons, the accumulator does not accumulate the digital value "01011", and the IP is not reset. Similarly, during sampling interval 3, 2 additional photons are detected by the IP, and the charge stored by the IP increases to a charge produced in response to detecting 13 accumulated photons (4 photons during sampling interval 1, 7 during sampling interval 2, and 2 during sampling interval 3). The pixel signal produced by the IP in response to this increased stored charge is converted to the digital value "01101". Since the accumulated 13 photons do not trigger the sampling threshold of 20 photons, the accumulator does not accumulate the digital value "01101", and the IP is not reset.

During sampling interval 4, 11 additional photons are detected by the IP. The charge stored by the IP increases to a charge equivalent to detecting 24 accumulated photons (4 during sampling interval 1, 7 during sampling interval 2, 2 during sampling interval 3, and 11 during sampling interval 4). The pixel signal produced by the IP in response to the stored charge is converted to the digital value "11000". Since the accumulated 24 photons exceeds the sampling threshold of 20 photons, the adder accumulates the digital value "11000" into the memory element for the IP, and the IP is reset.

The 14 photons detected during sampling interval 5 do not exceed the sampling interval of 20, the digital value produced by the ADC, "01110" is not accumulated and the IP is not reset. The 8 photons detected during sampling interval 6 results in an accumulated detection of 22 photons by the IP (14 photons during sampling interval 5, and 8 during sampling interval 6), and the adder accumulates the digital value "10110" (resulting in a total accumulated value of "000101110" into the memory element), and the IP is reset.

This process is repeated for each of the 16 sampling intervals. The digital values produced by the ADC during sampling intervals 10, 14, and 15 are all accumulated in response to the sampling threshold of 20 photons being exceeded by the number of accumulated photons detected by the IP. Accordingly, the IPs are reset for the sampling intervals following these intervals (sampling interval 11, 15, and 16). During sampling interval 16, 19 photons are detected by the IP, which does not exceed the sampling threshold of 20 photons. In addition, during sampling interval 16, a residue signal is received configured to instruct the accumulator to accumulate the digital value produced by the ADC (the residue value 190, "10011"). Accordingly, the adder accumulates the value "10011" to the maintained accumulation value "001111011" in the memory element to produce the image data 195, "010001110". Finally, a reset signal is received during sampling interval 16, which enables the read circuit to output the image data and which resets the values output by the ADC and stored at the accumulator to zero subsequent to outputting the image data.

FIG. 8 illustrates pixel information flow in an image capture system, according to one embodiment. During the course of an image capture period, an IP 200 detects photons and outputs pixel signals 202 to the read circuit. In response, the read circuit 204 converts the received pixel signals to digital values representative of the receive pixel signals, and for each digital value associated with a pixel signal that exceeds a sampling threshold, accumulates the digital value and resets the IP. After the image capture period, the accumulated digital values are output as image data 206.

A post processing module 208 receives the image data 206 and performs one or more processing operations on the image data to produce the processed data 210. In one embodiment, a response function can be used to transform the image data 206 according to a desired response. For example, the image data can be transformed with a linear function or a logarithmic function based on the intensity of the light detected by the IP. The processed data is then stored in memory 212 for subsequent retrieval and processing. The IP 200, the read circuit 204, the post processing module, and the memory can be located within an IC, or can be located within separate coupled ICs.

FIG. 9 illustrates various temporal sampling policies for use by an image sensor read circuit, such as the read circuit of FIG. 3, according to one embodiment. In the embodiment of FIG. 9, an image is captured over an image capture period 220 equivalent to 16 time units. For each of the three illustrated sampling policies, an "x" indicates the sampling of a given IP by a read circuit.

In sampling policy 1, the read circuit samples the IP after each of the 16 time units. In sampling policy 2, the read circuit samples the IP after every 4 time units. As the read circuit in sampling policy 2 samples the IP less frequently than the read circuit in sampling policy 1, the IP in sampling policy 2 is more likely to saturate than the IP in sampling policy 1. However, the resources (processing, bandwidth, and power) required to implement sampling policy 2 (4 total samples) may be lower than the resources required to implement sampling policy 1 (16 total samples), since the read circuit in sampling policy 2 samples the IP only 25% as often as the read circuit in sampling policy 1.

In sampling policy 3, the read circuit samples the IP after time units 1, 2, 4, 8, and 16. The exponential spacing of the samplings of sampling policy 3 provide short sample intervals (for instance, the sample interval between time unit 0 and time unit 1) and long sample intervals (for instance, the sample interval between time unit 8 and time unit 16). Allowing for both short and long sampling intervals preserves the dynamic range of sampling policy 1 with nearly as few samplings as sampling policy 2 (5 samplings for sampling policy 3 vs. 4 samplings for sampling policy 2). Other sampling policies not illustrated in FIG. 9 may also be implemented by read circuits in the image sensor systems described herein. Depending on the overall length of an exposure interval or other scene- or user-dependent factors, different sampling policies can be selected to meet desired power, SNR, dynamic range, or other performance parameters.

High-SNR Image Sensor with Non-Destructive Threshold Monitoring

While the three-transistor (3T) pixel architecture shown in FIG. 2 is suitable for many applications, four-transistor (4T) designs having a "transfer gate" disposed between the photodiode and source follower (i.e., between node "$V_{DET}$" of photosensitive element 65 and element 74 in FIG. 2)

provide a number of advantages. First, the now-isolated floating diffusion at the gate of the source follower may be reset (e.g., coupled to $V_{DD}$) without disturbing the charge state of the photodiode, thereby enabling a correlated double-sampling (CDS) operation in which the noise floor of the floating diffusion is sampled prior to charge integration and then subtracted from the subsequent sampling of the photodiode potential, canceling the noise and significantly improving the SNR. Another advantage is, counterintuitively, a more compact pixel design as the switched connection between the photodiode and source follower (i.e., via the transfer gate) enables the source follower, reset and access transistors to be shared among multiple photodiodes. For example, only seven transistors are required to implement a set of four "4T" pixels having a shared source follower, reset transistor and access transistor (i.e., four transfer-gates plus the three shared transistors), thus effecting an average of 1.75 transistors per pixel (1.75T).

In terms of pixel read-out, the direct connection between photodiode and source follower in a 3T pixel permits the charge state of the photodiode to be read-out without disturbing ongoing photocharge integration. This "non-destructive read" capability is particularly advantageous in the context of the conditional reset operation described above as the 3T pixel may be sampled following an integration interval and then conditionally permitted to continue integrating charge (i.e., not be reset) if the sampling operation indicates that the charge level remains below a predetermined threshold. By contrast, the charge transfer between photodiode and floating diffusion as part of a 4T pixel readout disrupts the state of the photodiode, presenting a challenge for conditional-reset operation.

In a number of embodiments described below in connection with FIGS. 10-14, a modified 4T pixel architecture is operated in a manner that dissociates the reset threshold from pixel sample generation to enable a non-destructive (and yet CDS) over-threshold determination. That is, instead of reading out the net level of charge accumulated within the photodiode (i.e., a pixel sampling operation) and conditionally resetting the photodiode based on that read-out (i.e., as in a 3T pixel sampling operation), a preliminary over-threshold sampling operation is executed to enable detection of an over-threshold state within the photodiode, with the full photodiode read-out (i.e., pixel sample generation) being conditionally executed according to the preliminary over-threshold detection result. In effect, instead of conditionally resetting the photodiode according to the pixel value obtained from full photodiode readout, full photodiode readout is conditioned on the result of a preliminary, and largely non-destructive, determination of whether the threshold has been exceeded; an approach enabled, in at least one embodiment, by dissociating the conditional-reset threshold from the pixel value generation.

Figure 10:
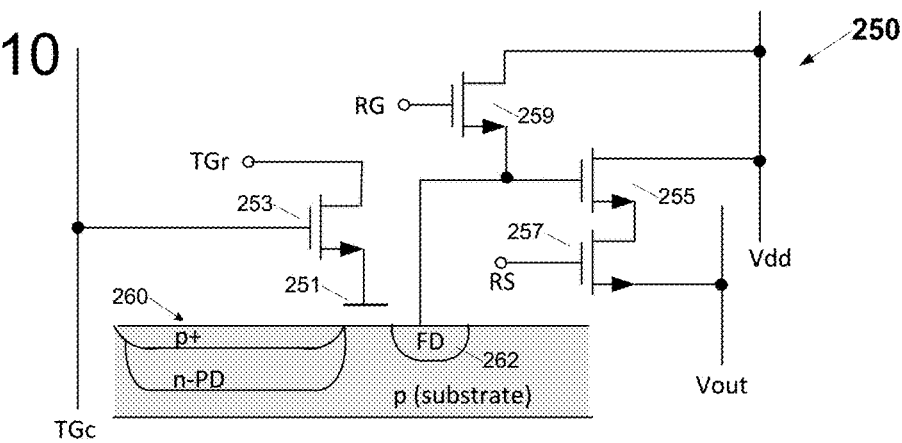
FIG. 10 illustrates an embodiment of a modified 4-transistor pixel in which a non-destructive over-threshold detection operation is executed to enable conditional-reset operation in conjunction with correlated double sampling.

FIG. 10 illustrates an embodiment of a modified 4T pixel 250, referred to herein as a "progressive read-out pixel," in which a non-destructive over-threshold detection operation is executed to enable conditional-reset operation in conjunction with correlated double sampling. As explained more fully below, the over-threshold detection involves a limited read-out of the photodiode state which, when determined to indicate an over-threshold condition, will trigger a more complete read-out of the photodiode state. That is, pixel 250 is read-out in a progression from a limited over-threshold detection read-out to a complete read-out (the latter being conditional according to the over-threshold detection result) and is thus referred to herein as a progressive-readout pixel.

Still referring to FIG. 10, progressive read-out pixel 250 includes a transfer gate 251 disposed between a photodiode 260 (or any other practicable photosensitive element) and floating diffusion node 262, and a transfer-enable transistor 253 coupled between a transfer-gate row line (TGr) and the control terminal (e.g., gate) of transfer gate 251. The gate of transfer-enable transistor 253 is coupled to a transfer-gate column line (TGc) so that, when TGc is activated, the potential on TGr is applied (minus any transistor threshold) via transfer-enable transistor 253 to the gate of transfer-gate 251, thus enabling charge accumulated within photodiode 260 to be transferred to floating diffusion 262 and sensed by the pixel readout circuitry. More specifically, floating diffusion 262 is coupled to the gate of source follower 255 (an amplification and/or charge-to-voltage conversion element), which is itself coupled between a supply rail ($V_{DD}$ in this example) and a read-out line, Vout, to enable a signal representative of the floating diffusion potential to be output to read-out logic outside the pixel.

As shown, a row-select transistor 257 is coupled between the source follower and the read-out line to enable multiplexed access to the read-out line by respective rows of pixels. That is, row-select lines ("RS") are coupled to the control inputs of row-select transistors 257 within respective rows of pixels and operated on a one-hot basis to select one row of pixels for sense/read-out operations at a time. A reset transistor 259 is also provided within the progressive read-out pixel to enable the floating diffusion to be switchably coupled to the supply rail (i.e., when a reset-gate line (RG) is activated) and thus reset. The photodiode itself may be reset along with the floating diffusion by fully switching on transfer gate 251 (e.g., by asserting TGc while TGr is high) and reset transistor 259 concurrently, or by simply connecting the photodiode to a reset-state floating diffusion.

Figure 11:
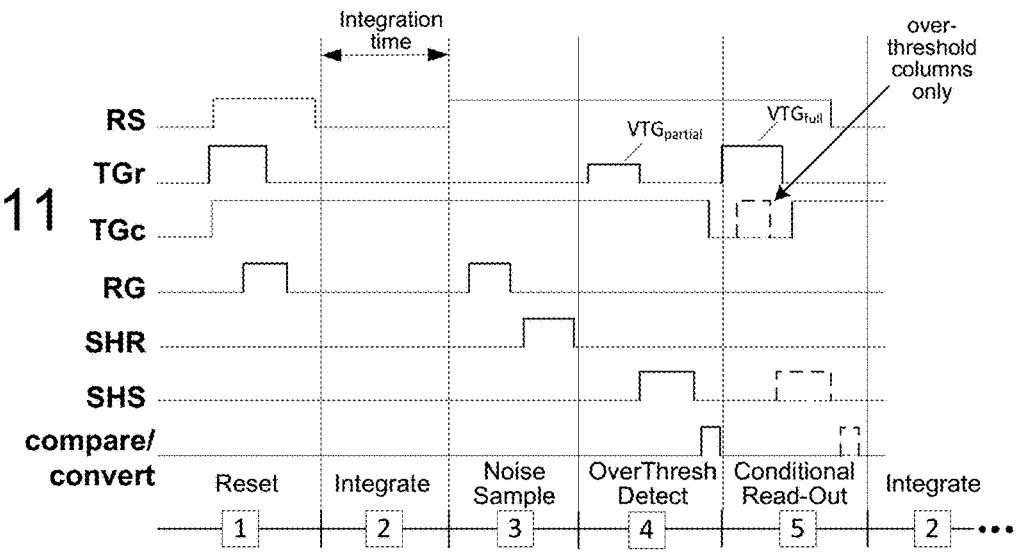
FIG. 11 is a timing diagram illustrating an exemplary pixel cycle within the progressive read-out pixel of FIG. 10.

FIG. 11 is a timing diagram illustrating an exemplary pixel cycle within the progressive read-out pixel of FIG. 10. As shown, the pixel cycle is split into five intervals or phases corresponding to distinct operations carried out to yield an eventual progressive read-out in the final two phases. In the first phase (phase 1), a reset operation is executed within the photodiode and floating diffusion by concurrently asserting logic high signals on the TGr, TGc and RG lines to switch on transfer-enable transistor 253, transfer gate 251 and reset transistor 259, thereby switchably coupling photodiode 260 to the supply rail via transfer gate 251, floating diffusion 262 and reset transistor 259 (the illustrated sequence can begin with an unconditional reset, e.g., at the start of a frame, and can also begin from a preceding conditional read-out/reset operation). To conclude the reset operation, the TGr and RG signals (i.e., signals applied on like-named signal lines) are lowered, thereby switching off transfer gate 251 (and sense gate and reset transistor) so that the photodiode is enabled to accumulate (or integrate) charge in response to incident light in the ensuing integration phase (phase 2). Lastly, although the row-select signal goes high during the reset operation shown in FIG. 11, this is merely a consequence of an implementation-specific row decoder that raises the row-select signal whenever a given row address is decoded in connection with a row-specific operation (e.g., raising the TGr and RG signals during reset directed to a given row). In an alternative embodiment, the row decoder may include logic to suppress assertion of the row-select signal during reset as indicated by the dashed RS pulse in FIG. 11.

At the conclusion of the integration phase, the floating diffusion is reset (i.e., by pulsing the RG signal to couple the floating diffusion to the supply rail) and then sampled by a sample-and-hold element within the column read-out circuit.

The latter operation, in effect, samples the noise level of the floating diffusion and is executed in the embodiment shown by asserting the row-select signal for the pixel row of interest (i.e., the "$i^{th}$" pixel row, selected by RSi) while pulsing a reset-state sample-and-hold signal (SHR) to convey the state of the floating diffusion to the sample-and-hold element (e.g., a switch-accessed capacitive element) within the column read-out circuit via read-out line Vout.

Figure 12:
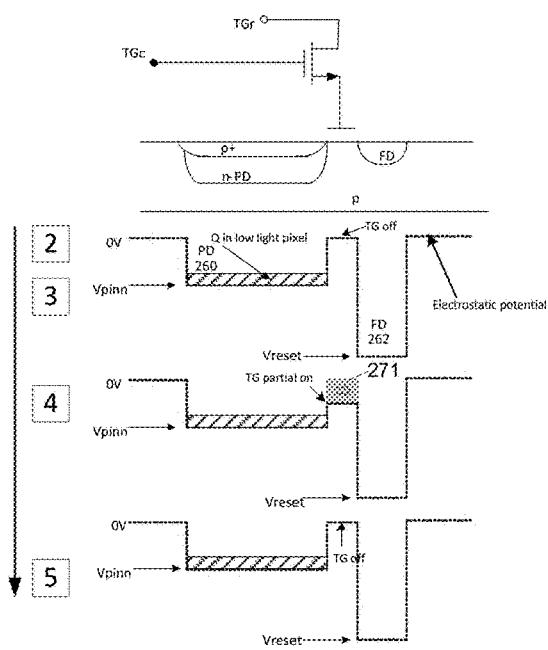
FIGS. 12 and 13 illustrate exemplary electrostatic potential diagrams for the photodiode, transfer gate and floating diffusion of FIG. 10 below their corresponding schematic cross-section diagrams.
Figure 13:
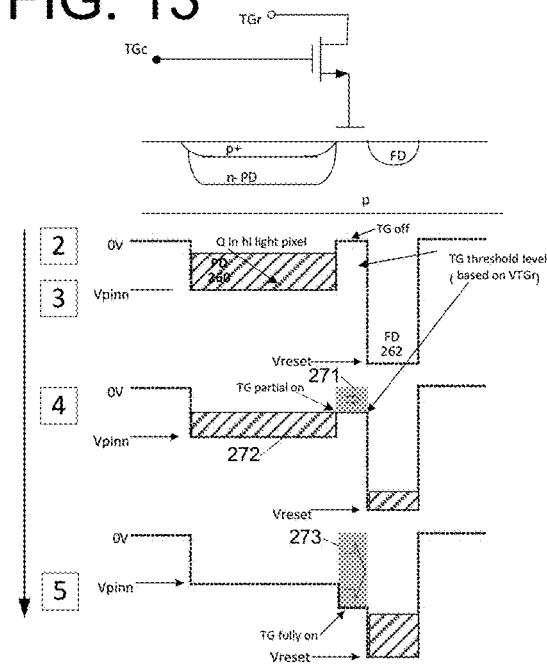

After acquiring the noise sample in phase 3, an over-threshold detection operation is executed in phase 4 by raising the TGr line to a partially-on, "over-threshold-detection" potential, $VTG_{partial}$, concurrently with switching on transfer-enable transistor 253 (i.e., by asserting a logic high TGc signal, although in this embodiment TGc is already on). By this operation, illustrated graphically in FIGS. 12 and 13, $VTG_{partial}$ is applied to the control node of transfer gate 251 to switch the transfer gate to a "partial on" state ("TG partial on"). Referring to FIGS. 12 and 13, electrostatic potential diagrams for photodiode 260 (a pinned photodiode in this example), transfer gate 251 and floating diffusion 262 are shown below their corresponding schematic cross-section diagrams. Note that the depicted levels of electrostatic potential are not intended to be an accurate representation of the levels produced in an actual or simulated device, but rather a general (or conceptual) representation to illustrate the operation of the pixel read-out phases. Upon application of $VTG_{partial}$ to the control node of transfer gate 251, a relatively shallow channel potential 271 is formed between photodiode 260 and floating diffusion 262. In the example of FIG. 12, the level of charge accumulated within the photodiode at the time of the over-threshold detection operation (phase 4) is insufficient to enable charge transfer via the shallow channel potential of the partially-on transfer gate. Accordingly, because the accumulated charge level does not exceed the spillover threshold established by application of $VTG_{partial}$ to the control node of transfer gate 251, there is no spillover from the photodiode to the floating diffusion and the accumulated charge instead remains undisturbed within the photodiode. By contrast, in the example of FIG. 13, the higher level of accumulated charge does exceed the spillover threshold so that a portion of the accumulated charge (i.e., that subset of charge carriers that are above the transfer gate partially-on electrostatic potential) spills over into floating diffusion node 262, with the residual accumulated charge remaining within the photodiode as shown at 272.

Still referring to FIGS. 11, 12 and 13, at the conclusion of the over-threshold phase, the charge level of the floating diffusion is sampled and held within a signal-state sample-and-hold element (i.e., in response to assertion of signal SHS) to yield a threshold-test sample—the difference between the signal-state sample and the previously obtained reset-state sample—to be evaluated with respect to a conditional-reset threshold. In one embodiment, the conditional-reset threshold is an analog threshold (to be compared with an analog threshold test sample in response to a compare-strobe signal using a sense amplifier for example) set or programmed to a setting above the sampling noise floor, but low enough to enable detection of minute charge spillover via the shallow transfer gate channel. Alternatively, the threshold-test sample may be digitized in response to assertion of a convert-strobe signal (e.g., within an analog-to-digital converter that is also used to generate the finalized pixel sample value) and then compared with a digital conditional-reset threshold, again, set (or programmed to a setting) above the noise floor, but low enough to enable detection of trace charge spillover. In either case, if the threshold-test sample indicates that no detectable spillover occurred (i.e., threshold-test sample value is less than conditional-reset spill charge threshold), then the photodiode is deemed to be in the under-threshold state shown in FIG. 12 and the TGc line is held low in the ensuing conditional read-out phase (phase 5, the final phase) to disable transfer gate 251 for the remainder of the progressive read-out operation—in effect, disabling further read-out from the photodiode and thus enabling the photodiode to continue integrating charge without disruption for at least another sampling interval. By contrast, if the threshold-testing sample indicates a spillover event (i.e., threshold-test sample greater than conditional-reset spill charge threshold), then the TGc line is pulsed on during the conditional read-out phase concurrently with application of a fully-on, "remainder-transfer" potential, $VTG_{full}$, to the TGr line, thereby enabling the remainder of the charge (272) within photodiode 260 to be transferred to floating diffusion 262 via the full-depth transfer-gate channel (273) so that, between the over-threshold transfer in phase 4 and the remainder transfer in phase 5, the charge accumulated within the photodiode since the hard reset in phase 1 is fully transferred to the floating diffusion where it may be sensed in a pixel read-out operation. In the embodiment shown, the pixel-readout operation is effected by pulsing the SHS signal and compare/convert strobe in sequence during conditional read-out phase 5, though either or both of those pulses may optionally be suppressed in absence of an over-threshold detection. Note that conditional read-out of the photodiode (i.e., effected by pulsing TGc in conjunction with application of $VTG_{full}$ on TGr) effectively resets the photodiode, while suppression of the conditional read-out leaves the integration state of the photodiode undisturbed. Accordingly, execution of the conditional read-out operation conditionally resets the photodiode in preparation for integration anew in the succeeding sampling interval (subframe) or refrains from resetting the photodiode to enable cumulative integration in the subsequent sampling interval. Thus, in either case, a new integration phase follows phase 5, with phases 2-5 being repeated for each subframe of the overall frame (or exposure) interval, before repeating the hard reset in a new frame. In other embodiments, where cumulative integration is permitted across frame boundaries, the hard reset operation may be executed to initialize the image sensor and omitted for an indeterminate period of time thereafter.

Figure 14:
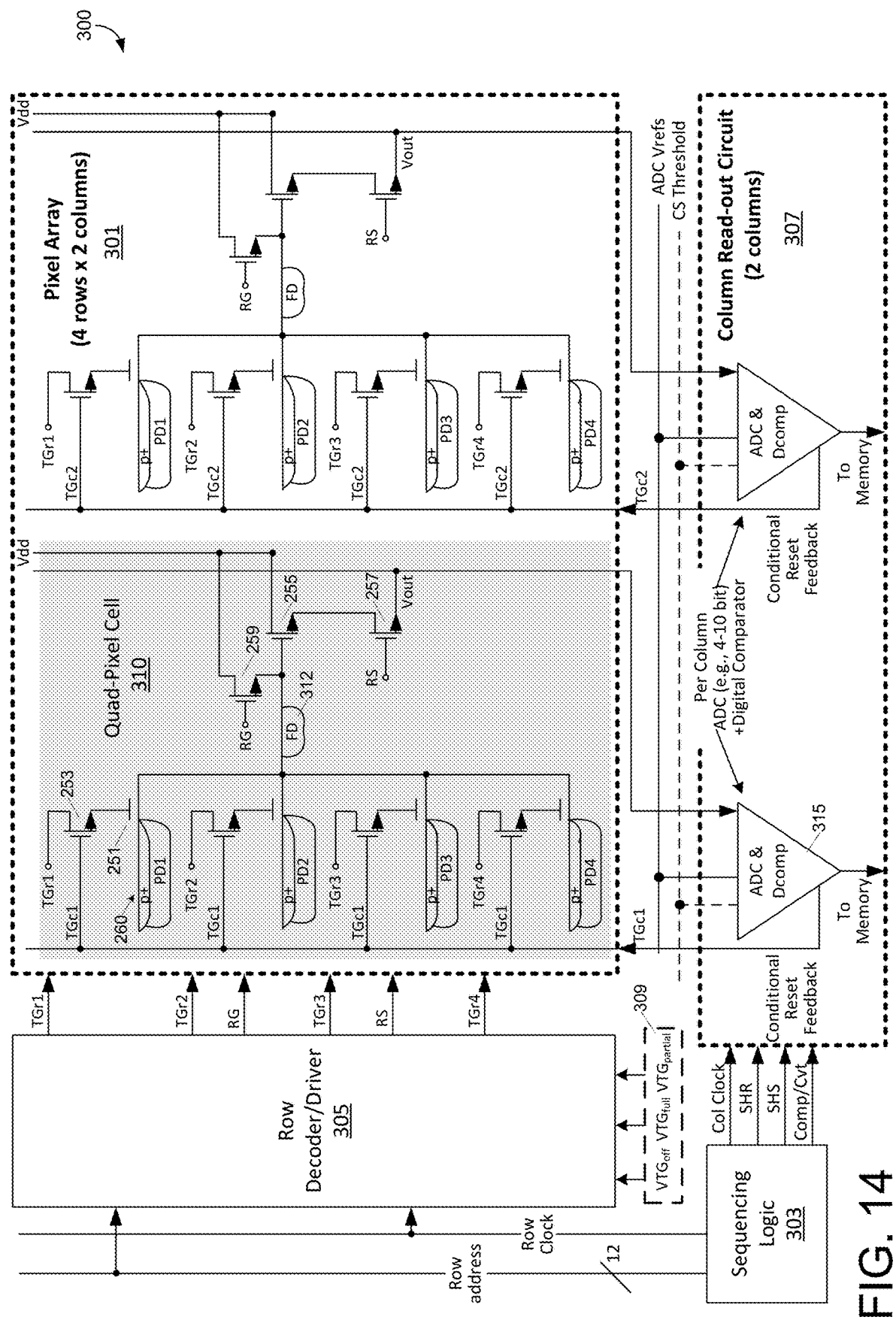
FIG. 14 illustrates an embodiment of an image sensor 300 having a progressive-readout pixel array.

FIG. 14 illustrates an embodiment of an image sensor 300 having a progressive-readout pixel array 301, sequencing logic 303, row decoder/driver 305 and column read-out circuit 307. While pixel array 301 is shown to include four rows and two columns of shared-element pixels, other embodiments may include many more pixel rows and columns to implement, for example, a multi-megapixel or gigapixel image sensor. The column read-out circuit 307 (for which two columns of read-out circuitry are depicted) and row decoder/driver 304 may likewise be scaled to meet the number of pixels in the pixel array.

In the embodiment shown, each column of the pixel array is populated by shared-element pixels in which every four pixels form a quad pixel cell 310 and contain respective photodiodes 260 (PD1-PD4), transfer gates 251, and transfer-enable gates 253, but share a floating diffusion node 312, reset transistor 259, source follower 255 and row-select transistor 257. By this arrangement, the average transistor count per pixel is 2.75 (i.e., 11 transistors/4 pixels), thus effecting a relatively efficient, 2.75T-pixel image sensor.

As shown, row decoder/driver 305 outputs a shared row-select signal (RS) and reset-gate signal (RG) to each row of quad-pixel cells 310, and outputs independent row transfer-gate control signals (TGr1-TGr4) to drain terminals of respective transfer-enable transistors 253. In an embodiment in which row decoder/driver 305 sequences incrementally through the rows of the array (e.g., pipelining reset, integration and progressive read-out operations with respect to the rows of pixel array 301 such that one row is read-out after another), the row decoder/driver may include logic to assert the RG, RS and TGr signals at the appropriate time for each row (e.g., synthesizing those signals with respect to a row clock from sequencing logic 303). Alternatively, row decoder/driver 305 may receive individual timing signals corresponding to each or any of the RG, RS and TGr signals, multiplexing any individual enable pulse onto the corresponding RG, RS, or TGr lines of a selected row at the appropriate time. In one embodiment, the row decoder/driver receives transfer-gate control voltages corresponding to the off, partially-on and fully-on states shown in FIGS. 11, 12 and 13 (i.e., $VTG_{Off}$, $VTG_{partial}$, $VTG_{full}$) from an on-chip or off-chip programmable voltage source 309, switchably coupling each of the different control voltages to a given transfer-gate row line at a deterministic time, for example, as shown in FIG. 11. In alternative embodiments, more than one voltage source 309 may be provided within image sensor 300 to enable transfer-gate control voltages to be locally calibrated and thus compensate for control-voltage and/or performance variations (i.e., non-uniformity) across the pixel array.

Still referring to the embodiment of FIG. 14, column read-out circuit 307 includes a bank of read-out circuits 315, each implementing a digital threshold comparator and a relatively low bit-depth analog-to-digital converter (e.g., a 4-10 bit ADC, though lower or higher bit depth ADCs may be employed) to execute the over-threshold detection and conditional sampling operations, respectively, discussed in connection with FIGS. 11-13. In one implementation, the threshold comparator and ADC are implemented by separate circuits so that the pixel sample value may be generated without regard to the conditional-reset threshold applied in the over-threshold determination. Through this approach, the conditional-reset threshold is dissociated from the reference signals ("ADC Vrefs") used in the ADC conversion, freeing the conditional-reset threshold and ADC reference voltages to be independently adjusted (e.g., through reprogramming a threshold-reference generator) dynamically during or prior to sensor operation to achieve calibration and/or compensate for changing operating conditions or sub-optimal imaging results. In an alternative embodiment, the threshold comparator may be implemented as part of the ADC (e.g., using a reference applied in connection with resolving the digital sample value as the conditional-reset threshold), potentially reducing the footprint of the column read-out logic through more compact circuit design.

In the embodiment shown, the sequencing logic delivers a column clock, sample-and-hold strobes (SHR, SHS), and compare/convert strobe to the column read-out logic to enable the operational timing shown, for example, in FIG. 11. That is, during the over-threshold detection phase (i.e., phase 3), the read-out circuit for a given pixel column asserts (or maintains assertion of) the TGc line so that, when the row decoder/driver switches the TGr line for a given pixel row to the partially-on potential (e.g., $VTG_{partial}$, which is applied to the transfer gates of the pixel row), execution of the over-threshold detection operation described above is enabled. Accordingly, the threshold comparator within each read-out circuit evaluates the state of the threshold-test sample (which is generated according to the state of shared floating diffusion 312 following application of $VTG_{partial}$ to the transfer gate of a given photodiode) with respect to the conditional-reset threshold to yield a binary over-threshold result. If an over-threshold condition is detected, the read-out circuit raises the TGc signal again a short time later (i.e., in conjunction with the fully-on TGr potential ($VTG_{full}$) to effect a conditional read-out operation, enabling a full read-out of the photodiode state onto Vout and resetting the photodiode) and executes an analog-to-digital conversion operation in response to assertion of the compare/convert strobe to yield a digitized pixel sample.

Correlated Double Sampling with Conditional Charge Restoration

Figure 15:
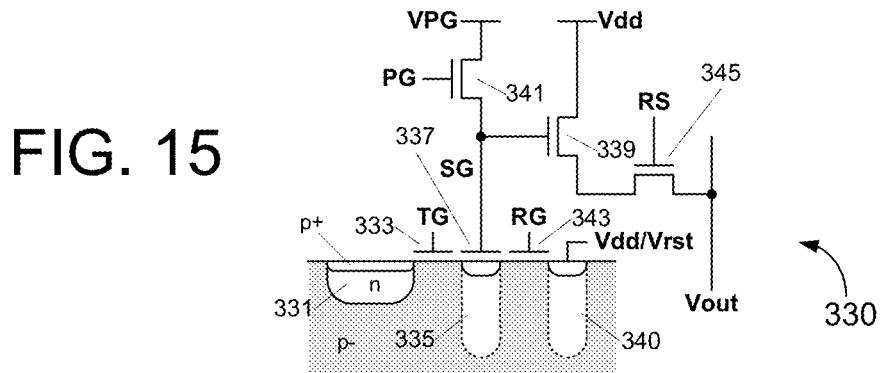
FIG. 15 illustrates an alternative conditional-reset pixel embodiment having a transfer gate disposed between photosensitive element and gate-controlled sense node to enable correlated double-sampling.

FIG. 15 illustrates an alternative conditional-reset pixel embodiment 330 having a transfer gate 333 disposed between a photosensitive element 331 (e.g., a pinned photodiode) and a gate-controlled sense node 335 to enable correlated double-sampling. As shown, sense node 335 is established by a sense gate 337 (e.g., the channel underlying the sense gate forms the sense node in response to a pre-charge potential VPG applied via photogate control transistor 341) and capacitively coupled to the gate of a source follower 339 via the gate terminal of the sense gate. Sense gate 337 is disposed between transfer gate 333 and a reset gate 343, which, as discussed below, enables charge transferred from photodiode 331 to sense node 335 to be either (i) discharged to a supply voltage node 340 (Vdd/Vrst) via reset gate 343 to effect a reset operation, or (ii) transferred back onto the photodiode 331 via transfer gate 333 to enable further charge integration, depending, for example, on whether the charge level read-out of the pixel exceeds a conditional reset threshold. Moreover, disposition of the transfer gate between sense node 335 and photodiode 331 enables a correlated double sampling operation, sampling the sense node before and after charge-transfer from the photodiode to yield a high SNR pixel read-out via source follower 339 and a row-select transistor 325. Thus, altogether, pixel architecture 330 enables a low-noise correlated double-sampling of the photodiode charge state, followed by either a reset operation or a charge restoration operation (i.e., driving charge back onto the photodiode) depending on whether the read-out result indicates an over-threshold condition within photodiode 331.

Figure 16:
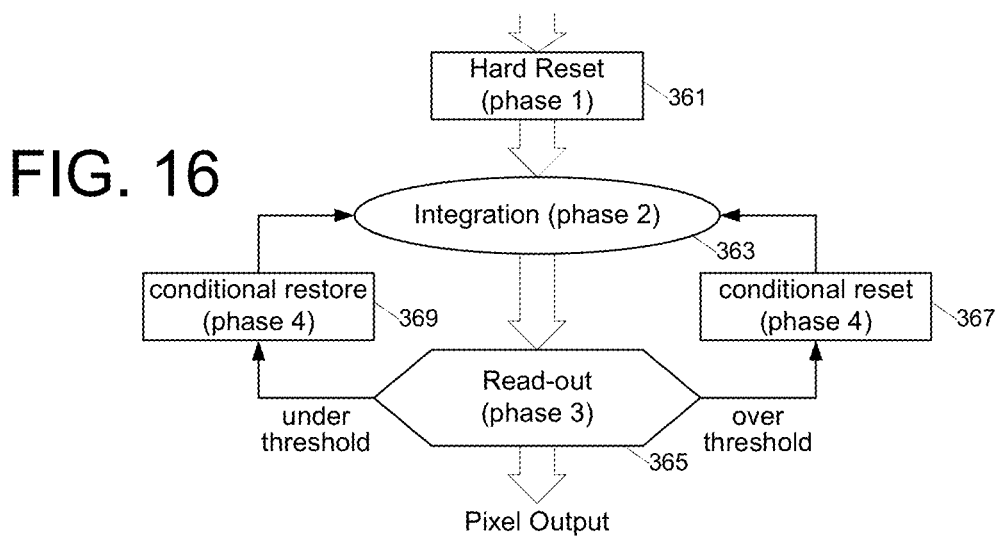
FIG. 16 illustrates exemplary operational phases within a pixel cycle of the conditional-reset pixel of FIG. 15.
Figure 17:
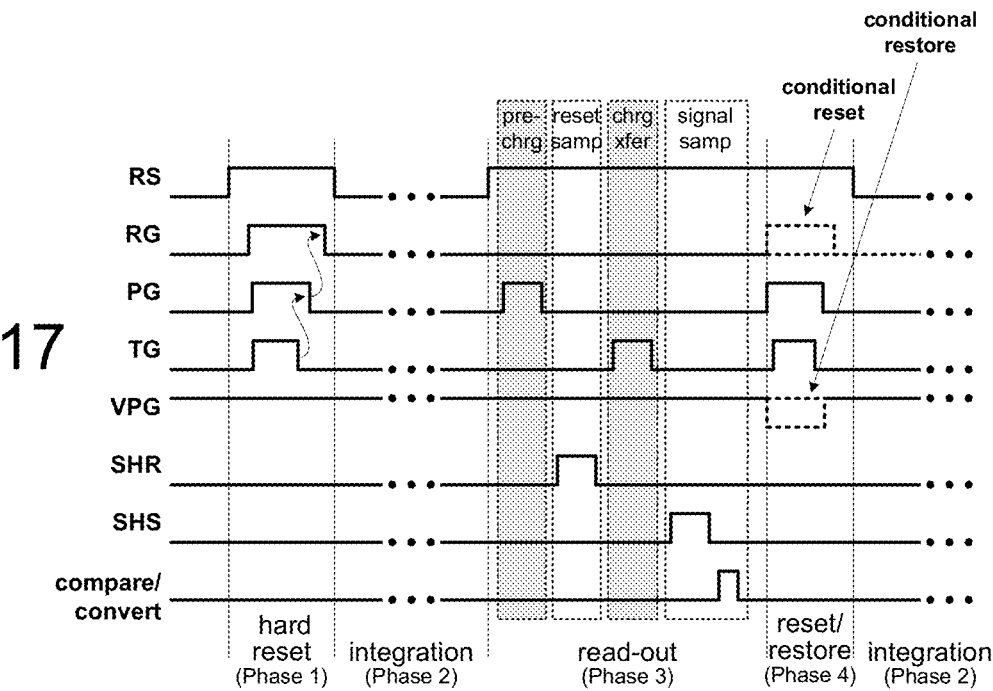
FIG. 17 is a timing diagram corresponding to FIG. 16 showing exemplary control signal states generated during each phase of operation within the conditional-reset pixel of FIG. 15.

FIG. 16 illustrates exemplary operational phases within a pixel cycle of the conditional-reset pixel of FIG. 15, and FIG. 17 presents a corresponding timing diagram showing exemplary control signal states generated during each phase of operation. FIGS. 18A-18G illustrate exemplary electrostatic potential states of the conditional-reset pixel during the operational phases shown in FIGS. 16 and 17. Referring to FIGS. 16 and 17, a hard reset (361) is carried out in phase 1 of the pixel cycle by setting the precharge voltage source (VPG) to a logic high level and asserting the row-select (RS), transfer gate (TG), photogate (PG) and reset gate (RG) signals (the last of which may be generated by logically ANDing row and column control signals to enable reset at pixel granularity). By this operation, the transfer gate, sense gate and reset gate are switched on (the sense gate being switched on by virtue of the switched coupling of the sense gate control node to VPG via the photogate control transistor) to form a conductive channel between the photodiode and supply voltage rail (e.g., $V_{DD}$ or Vrst). The state of the conditional-reset pixel during the reset operation is shown in FIG. 18A, with the conductive channel formed beneath the transfer gate, source gate and reset gate shown at 381, 383 and 385, respectively.

To conclude the reset phase and prepare for charge integration (i.e., charge accumulation in response to light incident upon the photodiode), the conductive channel between the photodiode and supply voltage rail (i.e., 381/383/385) is pinched off starting at the transfer gate and progressing toward the supply rail node. That is, the transfer gate is switched off first, then the sense gate, and then the reset gate, as shown in FIG. 18B, and by the successive falling edges of the TG, PG and RG control signals in FIG. 17, thus driving residual charge out of the collapsing channel to the supply voltage rail.

After concluding the photodiode reset operation in phase 1, the transfer gate, photogate control transistor and reset gate are maintained in the non-conducting state throughout an integration phase 363 (phase 2) in which charge is integrated (accumulated) within the photodiode in response to incident light as illustrated by the electron population ("e") in FIG. 18C.

Immediately following integration phase 363, a read-out phase 365 is commenced by pulsing the photogate control signal (PG) to effect formation of a sense node (i.e., as shown at 391 ("SN") in FIG. 18D) in preparation for a signal sensing operation, and raising the row-select signal to couple the output of the source follower to the Vout line (i.e., bit line). Note that the bit line is pulled up to near Vdd by this operation and is thus pre-charged in preparation for a read-out operation. After pulsing the photogate control signal to form the sense node and pre-charge the Vout line, a correlated double sampling operation is performed by (i) capturing a reset-state sample within a reset-state sample-and-hold element of the column read-out circuit by pulsing a reset-state sample-and-hold strobe (SHR) to store the state of the Vout line, (ii) pulsing the transfer gate signal (TG) to establish a conduction path between the photodiode and sense node and thereby effect a charge transfer from the photodiode to the sense node as shown in FIG. 18E, and then (iii) pulsing a signal-state sample-and-hold strobe (SHS) to store a sample of the photodiode state within a signal-state sample-and-hold element of the column readout circuit, and finally (iv) pulsing a compare/convert signal to trigger an A/D conversion of the difference between the signal-state and reset-state samples.

As indicated in FIG. 16, the correlated double sample result obtained during the read-out phase 365 is compared with a conditional-reset threshold to determine whether to reset the photodiode or to enable further integration without photodiode reset, the alternate conditional operations executed in phase 4. More specifically, if the sample result exceeds the conditional-reset threshold, then a conditional reset 367 is performed in phase 4 of the pixel cycle by pulsing the transfer-gate, photogate control transistor and reset gate signals as in hard-reset phase 1. By contrast, if the sample result does not exceed the conditional-reset threshold, then no reset operation is performed (i.e., RG signal is held low) and instead a conditional charge restoration operation 369 is executed by lowering the VPG potential to a level that repels charge from the sense node back onto the photo diode (i.e., pushes charge back onto the photodiode), thus restoring the photodiode to its pre-charge-transfer state. This operation is shown in FIGS. 18F (sense-node eliminated by lowering VPG) and 18G (transfer gate switched off to force charge back onto photodiode). Accordingly, the photodiode state is either reset to enable integration to commence anew or restored to its charge-accumulated state to enable cumulative integration (i.e., continue integrating from the photo-diode state that existed prior to the phase 3 charge-transfer operation), depending on whether the photodiode state sampled in read-out phase indicates an over-threshold condition. In either case, a further integration phase is commenced following phase 4, with phases 2-4 being repeated according to the number of sampling intervals (or sub-frames) per frame interval.

Figure 19:
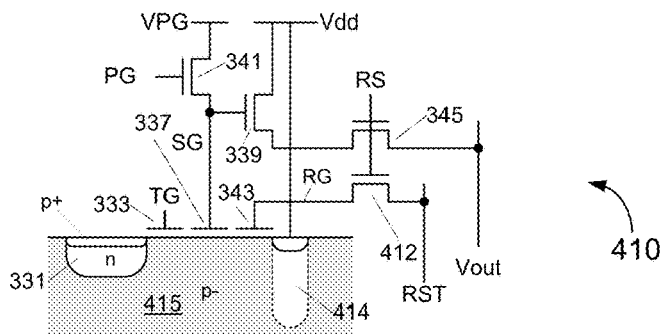
FIG. 19 illustrates an alternative embodiment of a conditional-reset pixel capable of executing the conditional-reset/conditional-restoration operations described in reference to FIGS. 16-18G.

FIG. 19 illustrates a more detailed embodiment of a conditional-reset pixel 410 capable of executing the conditional-reset/conditional-restoration operations described in reference to FIGS. 16-18G. In addition to the photodiode 331, transfer gate 333, sense gate 337, source follower 339, photogate transistor 341, reset gate 343, and row-select transistor 345 described in reference to FIG. 15, conditional-reset pixel 410 includes a reset-enable transistor 412 to effect a logic AND of a column-reset signal (RST) and row-select signals (RS), thus enabling assertion of the reset gate signal (RG) within selected (individual) pixels of a row, and a reset operation to be performed at individual pixel granularity. In the implementation shown, a reset signal (RST) is provided vertically (i.e., from column logic) via a column base signal line and logically ANDed with the row-select device within switching element 412 to yield the reset gate signal (RG) described in reference to FIG. 15. By this arrangement, hard reset and conditional reset operations within pixel 410 are effected through concurrent assertion of both row and column control signals (row-select, RS and column-reset, RST) associated with a given pixel, and thus at pixel granularity (i.e., a single pixel within the pixel array may be isolated for purposes of pixel reset operations). Accordingly, pixel 410 can be operated individually with respect to the pixel cycle phases described in reference to FIGS. 16 and 17, thus enabling a conditional reset for any individual pixel while also providing for a correlated double sampling in a non-destructive readout. This proposed structure achieves an advantageous readout scheme for a conditional reset pixel sensor, enabling effective and accurate measurement of a given pixel in a significantly wider signal range than obtained from conventional sensor readout. Like with the FIG. 14 embodiment, FIG. 19 can also be arranged such that multiple photodiodes 331 and transfer gates 333 share the other pixel circuitry of FIG. 19.

Analog Uncorrelated Double Sampling and Digitally Correlated Double Sampling

Figure 20:
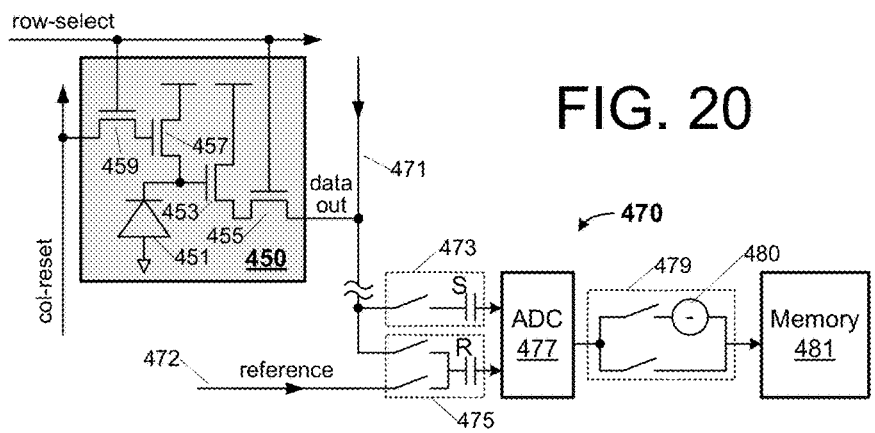
FIG. 20 illustrates an embodiment of a conditional-reset 3-transistor pixel and read-out circuitry that permits sampling noise reduction through both digitally correlated double sampling and analog uncorrelated double sampling.

FIG. 20 illustrates an embodiment of a conditional-reset 3T pixel 450 and read-out circuitry 470 that permits sampling noise reduction through both digitally correlated double sampling and analog uncorrelated double sampling. As shown, the 3T pixel includes a photodiode 451, a source follower 453, a read-select transistor 455, and a reset-AND gate which includes two transistors 457 and 459 to perform a logic AND of row-select and column-reset signals and thus, when those two control signals are asserted, switchably couple the photodiode to the supply rail. Read-out circuitry 470 includes a data-out line 471 (i.e., coupled to receive the photodiode state via read-select transistor 455), reference line 472 (i.e., coupled to an on-chip or off-chip reference voltage source), sample-and-hold elements 473 and 475, ADC 477, selective complement logic 479 and memory 481.

In an analog uncorrelated double sample, following an integration interval, the photodiode state may be: captured within signal-state sample-and-hold element 473 (i.e., closing and then opening the switch within element 473 to sample and hold the charge level on capacitive node S) in a signal sampling operation; reset through concurrent assertion of the column-reset ("col-reset") and row-select signals; and then sampled again to sample and hold the photodiode reset state within reset/reference sample-and-hold element 475. The difference between the charge-accumulated state and reset state of the photodiode (i.e., captured within storage nodes S and R of elements 473 and 475, respectively) may then be digitized within ADC 477 to yield a final sample value in which a systematic offset (i.e., a nonzero but repeated portion of the reset state of the photodiode and/or source follower offset) is canceled. The double sample thus obtained is referred to herein as an "uncorrelated" double sample because the photodiode reset operation follows the signal sampling operation, meaning that any residual charge (e.g., thermal noise, kTC) on photodiode 451 following the reset operation occurs without correlation to any residual charge on the photodiode in a previous reset that preceded the charge integration interval and signal sampling operations.

In the case of a digitally correlated double-sampling operation, the reset state of photodiode 451 (i.e., photodiode state immediately after concurrent assertion of row-select and col-reset signals) may be sampled, digitized within ADC 470 and stored as a negative value formed within memory element 479 (i.e., conceptually passing through complementing branch 480 of selective complement logic 479 on the way to memory 481). After an integration interval transpires, the charge-accumulated state of photodiode 451 may be sampled, digitized and delivered without complement (i.e., via the non-complementing branch of logic 479) to memory 481 and eventually summed with the negative value of the reset-state sample to yield a correlated double sample. The overall sampling operation is referred to herein as a digitally correlated double-sampling due to the digital storage of the reset and charge-accumulated states of photodiode 451. In digital correlated double sampling the sampling is performed by comparing both before and after accumulation against the reference. In both cases the signal from the photo diode is stored on sample and hold capacitor 473, the reference is stored on sample and hold capacitor 475 and the ADC measures the difference between the samples stored in these two sample and hold capacitors.

Figure 21:
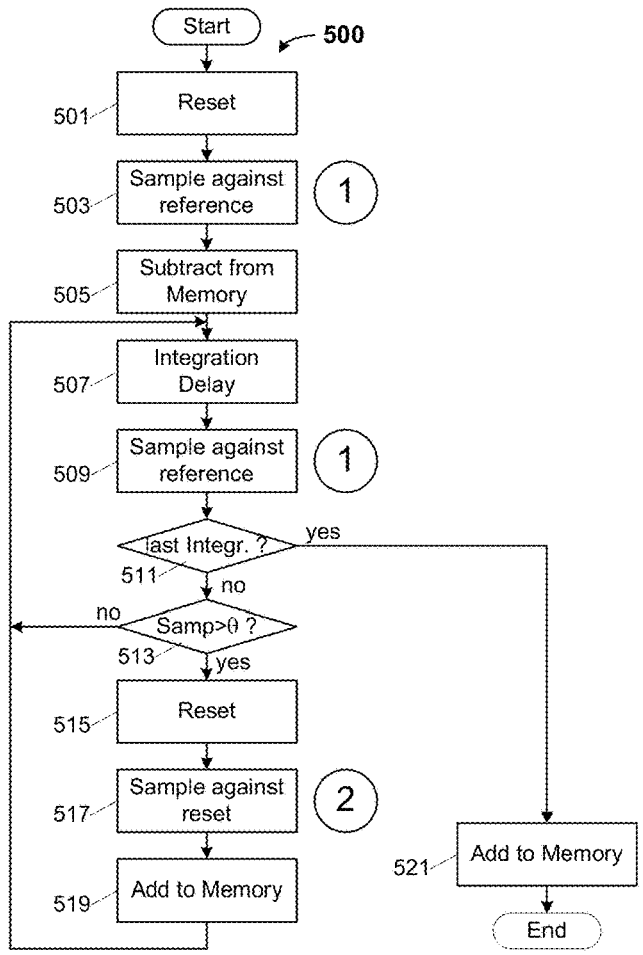
FIG. 21 is a flow diagram illustrating a combination of a digitally correlated double sampling operation with one or more analog uncorrelated double sampling operations that may be carried out to achieve a reduced-noise pixel read-out within the conditionally-reset three-transistor pixel and read-out architecture of FIG. 20.

FIG. 21 is a flow diagram illustrating a combination of a digitally correlated double sampling operation with one or more analog uncorrelated double sampling operations that may be carried out to achieve a reduced-noise pixel read-out within the conditionally-reset 3T pixel and read-out architecture of FIG. 20. At the start of an exposure or frame interval, a hard reset operation is performed at 501 to reset the photodiode in preparation for photon-induced charge integration, followed at 503 by a sample of the photo-diode reset-state with respect to a reference signal (e.g., delivered via reference line 472 in FIG. 2). The resulting "sample against reference" is stored as a negative value (i.e., passing through the complementing branch of logic 479) within memory at 505 (equivalently, the sample taken at 503 can be stored as a positive value, and then recalled later for subtraction against a second sample). After an integration period transpires (507), the photodiode state is again sampled with respect to the reference at 509. If the immediately concluded integration period was the final integration period of a fixed frame interval (affirmative determination at 511), then the sample acquired at 509 is added to memory at 521 to effect a digitally correlated double sampling (i.e., establishing (or enabling determination of) the difference between the negative reset-state sample stored at 505 and the positive accumulated charge sample stored at 521). If the integration period at 507 is not the last integration period in the exposure interval (negative determination at 511), then the sample acquired at 509 is compared with the conditional-reset threshold ($\theta$) in decision operation 513. If the sample indicates that the accumulated charge within the photodiode is less than the threshold (negative determination at 513), then the operations at 507, 509 and 511 are repeated to permit charge accumulation to resume within the photodiode (i.e., no photodiode reset) through another integration period, and followed again by a determination as to whether the final integration period has transpired and, if not, whether the conditional-reset threshold has been exceeded.

Still referring to FIG. 21, if the sample acquired at 509 indicates that the conditional-reset threshold has been exceeded (i.e., accumulated photodiode charge>$\theta$), then a reset operation is executed at 515 to reset the photodiode, followed by generation of a signal sample against the reset potential at 517. More specifically, the signal-state sample remains within the signal-state sample-and-hold element (i.e., element 473 of FIG. 20) following the immediately preceding sampling operation at 509, so that by switching the input source of the reset/reference sample-and-hold element (e.g., element 475 of FIG. 20) from the reference line to the Vout line and sampling the Vout line within the reset/reference sample-and-hold element, the previously acquired signal-state sample and newly acquired reset-state sample may be delivered differentially (i.e., signal state minus reset state) to the analog to digital converter to digitize the analog uncorrelated double sampling. In effect, the determination that the pixel-state is to be reset (i.e., affirmative determination at 513), triggers a substitution of the photodiode reset-state sample for the reference sample within the reset/reference sample-and-hold element, thus permitting generation of an analog uncorrelated double sample.

As shown, the digitized value of the analog uncorrelated double sample is added to the memory at 519 and then a new integration period and ensuing operations are begun at 507. At the final integration interval, the sample against reference acquired at 509 is added to memory at 521 as explained above, thus concluding the exposure interval. Accordingly, assuming that some non-zero number (N−1) of conditional reset operations 515 are carried out within a given exposure interval, then the accumulated sample set will be:

$$[Ref_0-RS_0]+\Sigma_{i=1}^{N-1}[SS_i-RS_i]+[SS_N-Ref_N] \quad (1),$$

where "SS" is a signal-state (i.e., state of the charge-accumulated photodiode plus the prior reset state) sample, "RS" is a reset-state sample, "Ref" is a reference line state sample, and '−' and '+' denote subtraction and addition, respectively. That is, N−1 analog uncorrelated double-sampling operations are bookended by a digitally correlated double-sampling operation. Moreover, because each analog uncorrelated double-sampling operation itself involves capture and differencing of the noise (e.g., kTC noise) associated with two different reset operations (i.e., the one preceding the integration value sampled in an SS sample and the reset operation 515 following an intermediate SS sampling), the reset state captured with respect to one analog uncorrelated double sample is in fact correlated to the signal state captured with respect to a subsequent uncorrelated double sample. That is, expanding expression (1) above by defining SS(i)=RS(i−1)+CI(i), where CI is the charge integrated since the last reset operation plus quantization/other non-stationary noise, yields:

$$[Ref_0-RS_0]+\Sigma_{i=1}^{N-1}[CI_i+RS_{i-1}-RS_i]+[CI_N+RS_{N-1}-Ref_N] \quad (2),$$

which, upon re-associating, may be expressed as:

$$\Sigma_{i=1}^{N}CI_i+[Ref_0-Ref_N] \quad (3).$$

Thus, the combination of analog uncorrelated double sampling operations and the digitally correlated double-sampling operations yields, in effect, a set of fully correlated double-sampling operations together with a difference between the reference signal sample acquired at the start and end of the integration interval, the latter being negligible in the case of a relatively temporally noise-free reference source.

Figure 22:
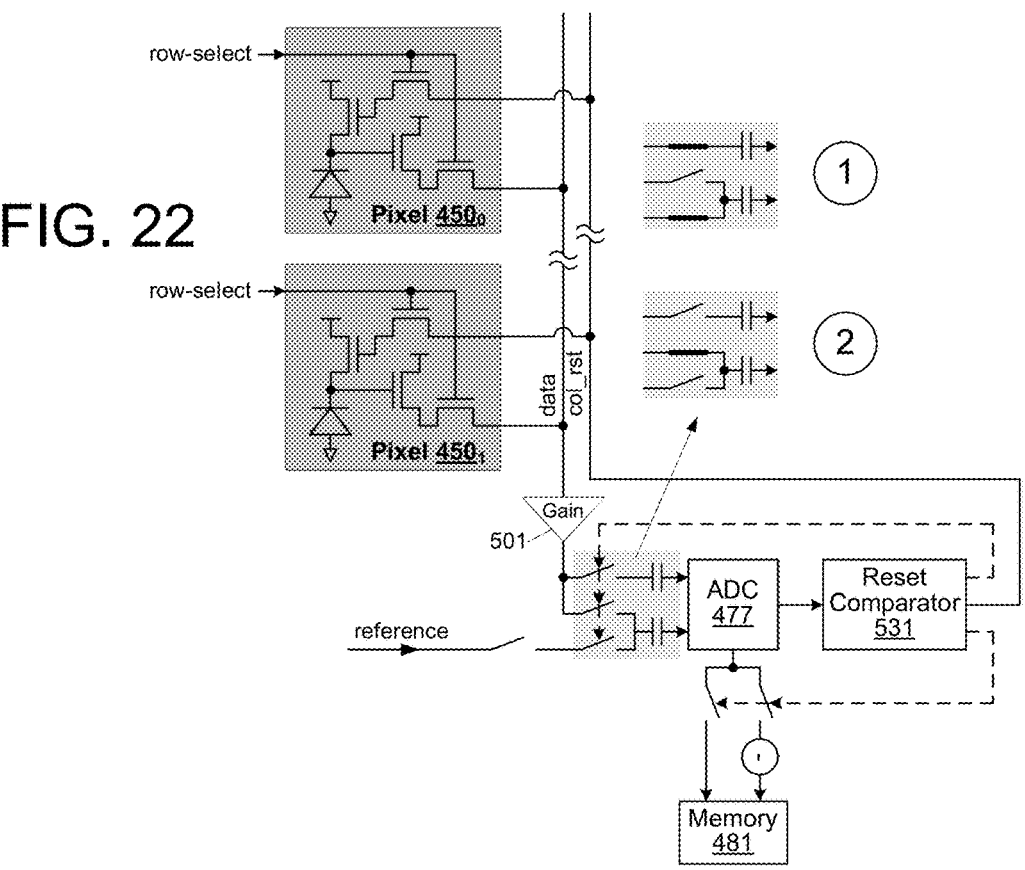
FIG. 22 illustrates a more detailed embodiment of the pixel architecture and read-out circuit of FIG. 20.
Figure 23:
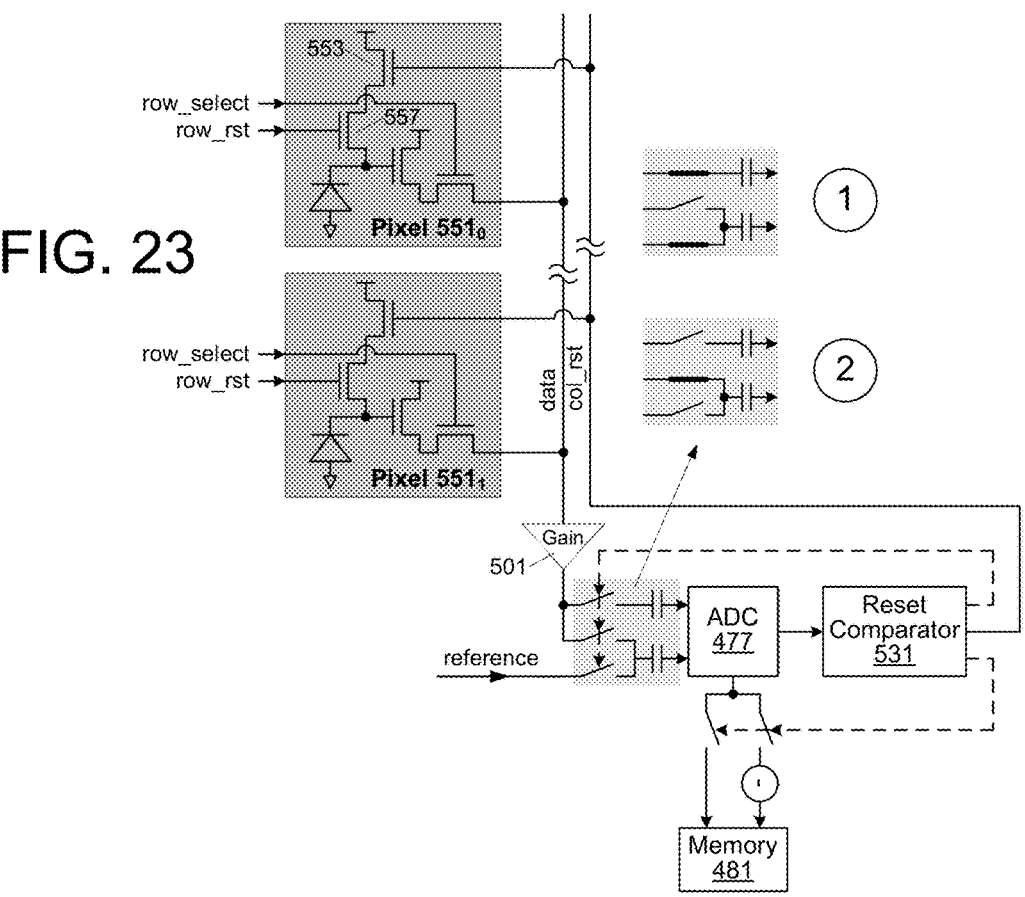
FIG. 23 illustrates an alternative embodiment of the pixel architecture presented in FIGS. 20 and 22.

FIG. 22 illustrates a more detailed embodiment of the pixel architecture and read-out circuit of FIG. 20, showing exemplary switch settings within the signal-state and reset/reference sample-and-hold elements during (1) the sample against reference operations shown at 503 and 509 in FIG. 21, and (2) the sample against reset operation shown at 517 in FIG. 21. As shown in FIG. 22, the read-out circuit, like all read-out circuits disclosed herein, may include a gain element 501 to provide gain greater than or substantially equal to unity. Also, two pixels 450 (shown as $450_0$ and $450_1$) are illustrated instead of one, to demonstrate column line interconnections. FIG. 23 illustrates an alternative embodiment of the pixel architecture presented in FIGS. 20 and 22. As shown, reset transistors 553 and 557 are disposed in series between the photodiode and supply voltage node to form a logic AND gate. Also, a dedicated row-reset signal ("row_rst") is provided to switch on/off transistor 557 and thus avoid the thermal noise injection that may otherwise occur if controlled by the row-select signal.

In conditional-reset image sensor embodiments discussed thus far, unconditional-reset operations are executed at the conclusion of each non-final subframe within an overall frame (or exposure) interval, with any residual pixel value (i.e., level of accumulated charge, whether above the conditional-reset threshold or not) being read out at the conclusion of the final subframe. Through this operation, referred to herein as "residue mode" read-out, a finalized pixel value may be constructed for each frame using the non-final subframe read-outs and the residue read-out (for instance, by summing and reference to a lookup table).

Figure 24:
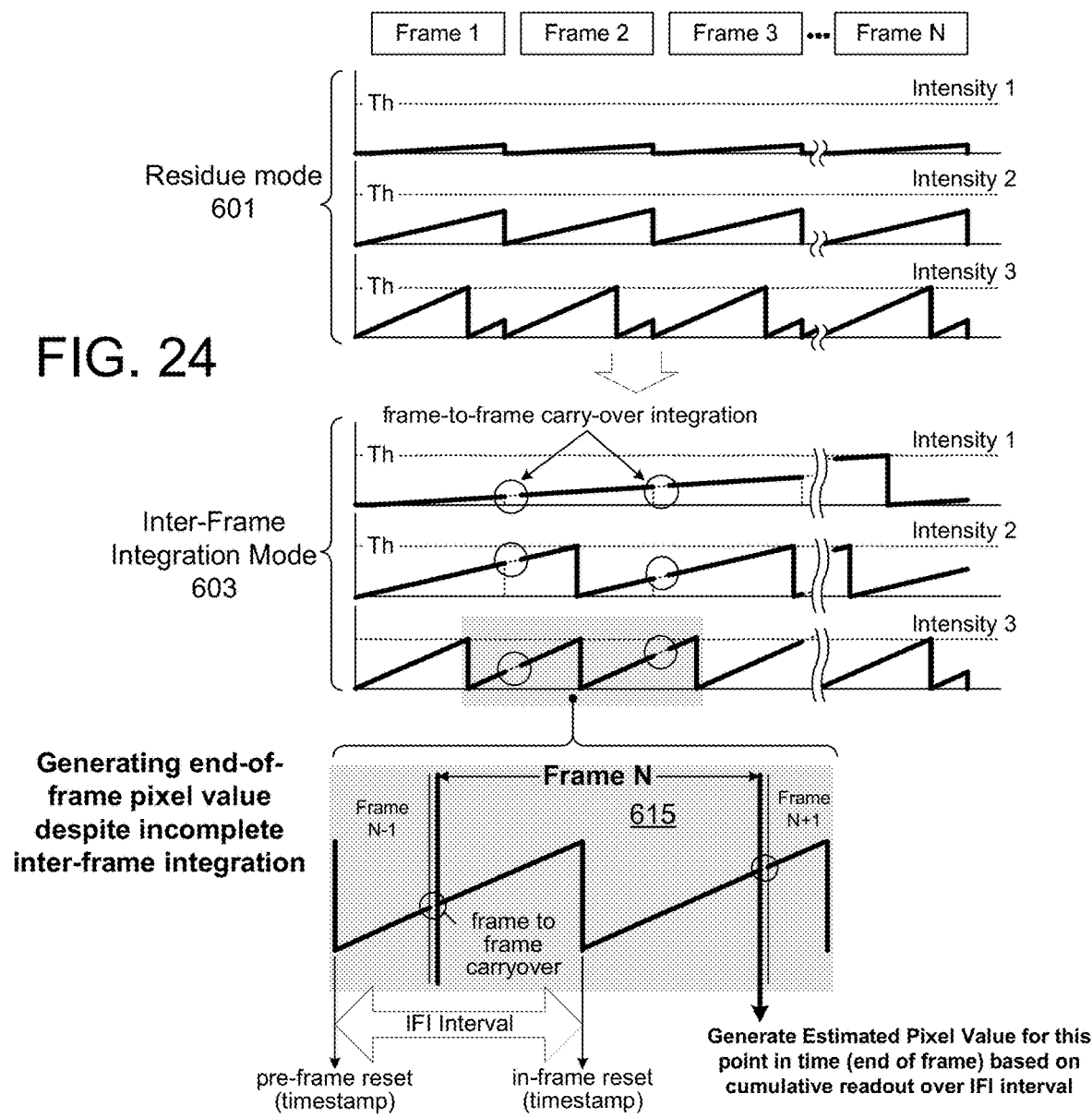
FIG. 24 illustrates exemplary residue-mode and inter-frame integration read-outs with respect to varying light intensities.

Referring to the exemplary residue-mode read-out sequence for three different charge accumulation patterns shown at 601 in FIG. 24, it can be seen that, at extremely low-light intensities (i.e., intensity 1), the total charge accumulated in each of N frames never rises far above the noise floor, yielding relatively noisy dark pixels which are particularly noticeable in the case of video frames. At the considerably brighter intensity 2, the per-frame charge accumulation still fails to exceed the conditional-reset threshold ("Th"), but at least rises sufficiently above the noise floor to yield a reasonable SNR. At the even brighter intensity 3, the per-frame charge accumulation meets the conditional-reset threshold shortly before end-of-frame, but leaves a low-valued and thus low SNR end-of-frame residue that tends to degrade the overall SNR of the image frame.

FIG. 24 also illustrates, for purpose of contrast, application of an alternative read-out mode, referred to herein as inter-frame integration mode (IFI) or dynamic range extension mode (DRX), to the same three light intensities. In the inter-frame integration mode, instead of performing an unconditional reset at the start of each frame for each pixel, integrated charge remaining at the end of a given frame for a given pixel is carried over to the next frame if the threshold is not exceeded on the last frame readout, effectively extending the maximum duration over which a pixel is enabled to continuously integrate charge. Through this operation, low-level light intensity may be integrated through a sequence of frames, rising well above the noise floor to yield an eventual reset, or at least a meaningful residue read-out if the inter-frame integration is limited to a fixed number of frames. In the case of an IFI read-out at intensity 1, for example, in contrast to the sequence of low SNR read-outs acquired in residue mode, charge integration continues through a sequence of N frames to an eventual reset event, thereby yielding a high SNR result. At intensity 2, inter-frame integration yields a steady sequence of reset events that may be used to generate a high SNR read-out, generally matching the performance of residue mode. For higher intensity 3, the IFI approach enables the small level of residual charge at the end of each frame to contribute to the charge integration in the next frame, thus avoiding the degrading effect of the low-SNR residue read-outs.

Reflecting on FIG. 24, it can be seen that inter-frame integration, in effect, eliminates the framing boundary as a demarcation point for finalizing image pixel values, presenting a dilemma as to how to meet the requirement for end-of-frame pixel value generation (e.g., in a video imaging system which yields a steady output frame rate) in view of incomplete inter-frame integration. Detail view 615 illustrates an approach employed in a number of embodiments presented herein, including recording timestamps of reset events to enable determination of an elapsed "inter-frame integration interval" (IFI interval or IFI period) between the final reset event within a given frame N (the "in-frame reset") and the most recent reset from a prior-frame (the "pre-frame" reset), (ii) aggregating pixel sample values acquired at one or more reset events during the IFI interval to determine the total charge integrated within the pixel over the IFI interval, and then (iii) estimating or predicting an end-of-frame pixel value based on the IFI interval and the total charge integrated over that interval. Estimating the end-of-frame pixel value is particularly challenging where one or more successive image frames are entirely devoid of reset events and thus contain no non-zero samples for a given pixel (e.g., as in the examples of intensities 1 or 2 in FIG. 24). In a number of embodiments, described in further detail below, the pixel value in such frames is estimated on the basis of the pixel value determined at the most recent reset event, and potentially attenuating the estimate as the last-determined pixel value ages.

Figure 25:
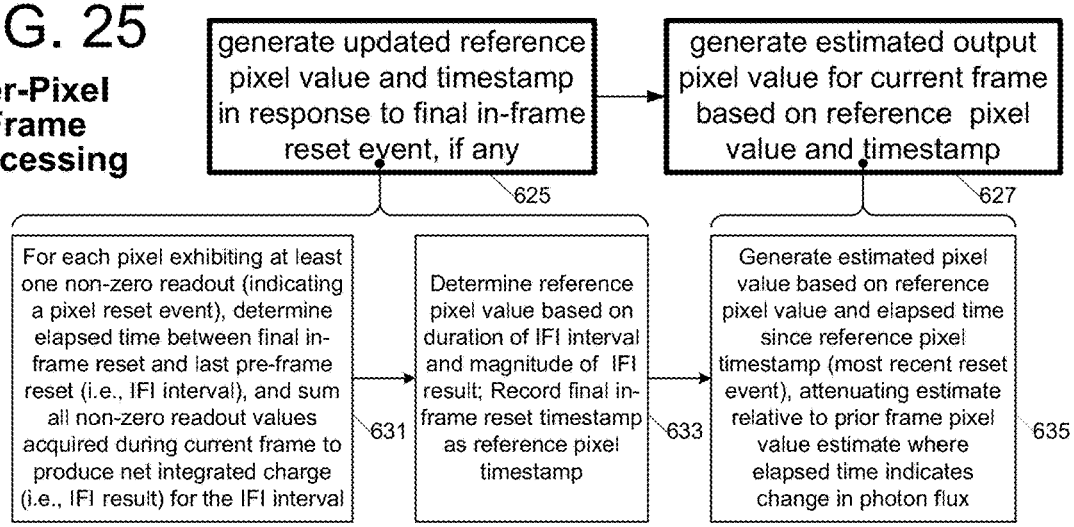
FIG. 25 illustrates an exemplary per-pixel frame processing approach that may be employed within a still or video imaging system, leveraging the inter-frame integration approach shown in FIG. 24 to yield relatively high-SNR images in low light conditions.

FIG. 25 illustrates an exemplary per-pixel frame processing approach that may be employed within a still or video imaging system, leveraging the inter-frame integration approach shown in FIG. 24 to yield relatively high-SNR images in low light conditions. As shown, two high-level operations are performed: first, at 625, an updated reference pixel value is generated, and corresponding reference timestamp recorded, in response to the final reset event occurring within the subject image frame, if one or more in-frame reset events in fact occurred. Then, at 627, an output pixel value is estimated for the image frame based on the reference pixel value and reference timestamp.

Reference pixel generation and timestamping within operation 625 may be implemented by the component operations shown at 631 and 633. More specifically, as shown at 631, for each pixel exhibiting at least one non-zero readout during the current frame (i.e., indicating that a conditional reset was executed), the imaging system determines, as the IFI interval, the elapsed time between the final in-frame reset and the most recent pre-frame reset, and also sums all non-zero read-out values acquired during the current frame to produce, as the IFI result (or IFI value), a value of the net amount of charge integrated within the pixel over the IFI interval. At 633, a reference pixel value is determined based on the duration of the IFI interval and magnitude of the IFI result (e.g., through table lookup and/or calculation or heuristic), and the timestamp of the final in-frame reset (i.e., the most recent reset event and thus the end of the IFI interval) is recorded as the reference pixel time stamp. Continuing to component operation 635, which corresponds to high-level operation 627, an estimated pixel value is generated based on the reference pixel value and the elapsed time since the most recent reset event (i.e., indicated by the reference pixel timestamp), attenuating the current-frame pixel estimate relative to the reference pixel value (and updating the reference pixel value to reflect the new estimate) where the reference pixel timestamp indicates that no IFI result was obtained in the current frame and the elapsed time indicates that the light intensity indicated by the prior-frame estimate has dropped. This latter circumstance, referred to herein as "coasting pixel attenuation" is described in further detail below in reference to FIG. 28.

Figure 26:
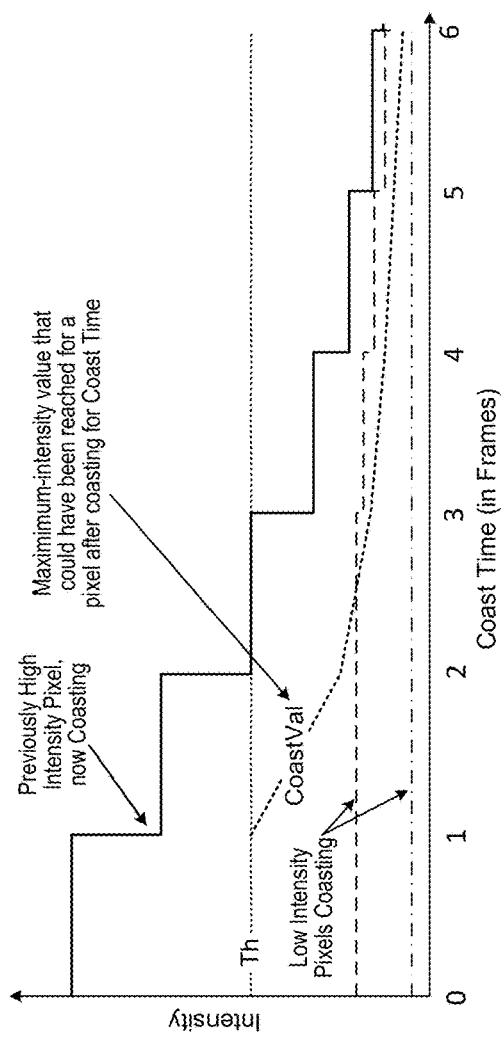
FIG. 26 illustrates an embodiment of an imaging system capable of generating image frames using the inter-frame integration approach outlined in FIGS. 24 and 25.

FIG. 26 illustrates an embodiment of an imaging system 650 capable of generating image frames using the interframe integration approach outlined in FIGS. 24 and 25. As shown, imaging system 650 includes an image sensor IC 651 ("imager"), image signal processor IC 653 ("ISP") and memory IC 655. Though depicted as discrete integrated circuit components, in alternative embodiments, the functions performed by one or more of the ICs may be merged into another of the ICs and/or the ICs may be interconnected components in a variety of different multi-chip packages, including a three dimensional IC stack (3D IC) with, for example, the die of imager 651 being ground (or lapped or otherwise thinned) to enable backside illumination and having contact-side interconnection to elements within the ISP 653 and/or memory 655.

In the embodiment shown, imager 651 outputs raw frame data to ISP 653, at least conceptually outputting one subframe of read-out data after another ($sf_0$-$sf_{m-1}$) and, within each subframe, outputting out one row of read-out data after another ($r_0$-$r_{n-1}$) (in fact, rolling shutter constraints and/or different schedules for different rows may preclude such an orderly approach). In one embodiment, imager 651 and ISP 653 each assume a predetermined subframe duration and row read-out order so that the imager need not provide subframe or row identifiers within (or in association with) the raw data output. In alternative embodiments, imager 651 may tag the raw frame data as necessary with row identifiers and time stamps to explicate the frame data organization. In either case, ISP 653 stores each incoming raw frame data within a raw frame data buffer 661 (in memory 655), e.g., until the data can be processed to create output frame values. In one embodiment, ISP 653 operates on the subframes and subframe rows of the raw frame data within buffer 661 concurrently with receiving and loading new raw frame data into buffer 661, pipelining new output frame generation ("frame out") with receipt of raw frame data from imager 651, for example, at the frame rate established by the imager. In an alternative embodiment, ISP 653 may operate on all or part of the incoming raw frame data as it is received, buffering intermediate data (i.e., partially processed data) as necessary to produce a finalized output frame "frame out."

For purposes of explanation only, each pixel value output by imager 651 as part of the raw frame data is assumed to include eight 12-bit pixel samples generated, respectively, by sixteen subframe readouts (i.e., 16× temporal oversampling and 10-bit ADC within imager 651, with some of the subframe outputs pre-summed by the imager prior to raw subframe transmission as explained below), so that raw frame data buffer 661 is sized to permit storage of 96 bits per pixel (bpp). A larger or smaller raw frame data buffer may be implemented (or set through production-time or run-time mode-register programming) to accommodate different numbers of subframes per frame and/or different bit-depth ADC implementations or configurations.

In an IFI operating mode in which there is no final-frame residue readout (e.g., a video imaging IFI mode), only those pixel samples acquired in connection with over-threshold events (and thus pixel reset) will be non-zero values. Accordingly, at least in low-light conditions, a substantial number of the pixel samples will be zero-valued, enabling substantial compression in chip-to-chip data transmission (in some examples, intermediate subframe compression can produce on the order of one bit-per-pixel output). By contrast, in a residue operating mode as shown at 601 of FIG. 24, a residue read-out is executed at the conclusion of the final subframe of each frame, ensuring in the present example that at least 12% (⅛) of the raw frame data will likely be nonzero and not easily compressible, thus requiring higher average chip-to-chip signaling bandwidth and memory bandwidth within imaging system 650. Note that a final-frame residue readout may be executed in connection with a still-imaging IFI mode. For example, a finite number (N−1) of raw frames may include IFI data only (no residue readout) which, after being processed as described below, are algorithmically combined with a final ($N^{th}$) raw frame containing a final-subframe residue readout. The value of N may be set by an imaging system operator (i.e., via a user-interface coupled to ISP 653 or another IC within imaging system 650) according to conditions at hand, thus enabling continuous low-light accumulation throughout the N frames, concluded by a residue readout to finalize the still output image.

In addition to loading data from imager 651 into raw frame data buffer 661, ISP 653 tracks last time stamps of reset events for each pixel within a reset timestamp buffer 663, and also maintains the estimated pixel values of the most recently output frame within last-frame buffer 655 (e.g., resolved to 12 bpp in the example shown, though higher or lower bit output pixel resolutions may be generated and recorded in alternative implementations), either of which may be implemented within memory 655 as shown, or in a separate memory element. As mentioned briefly above and explained in further detail below, the timestamps are used to determine IFI intervals and the "last frame" values are applied in pixel value estimations for coasting pixels (i.e., pixels for which no reference pixel value is determined within the frame being processed). In one embodiment, explained in further detail in connection with FIG. 27, a three-bit timestamp code is used to distinguish eight actual or approximate end-of-subframe times within each frame, and a five-bit frame number is used to identify prior frames, thus yielding an 8 bpp time stamp that resolves to the approximate subframe endtimes within the most recent 32 frames. Larger timestamps (i.e., more bpp) may be recorded in alternative embodiments to enable a larger frame-history window and/or more temporal resolution per frame, or the timestamp may use a quasi-floating-point format where coarser resolution and larger range are used to record timestamps older than 32 frames.

Figure 27:
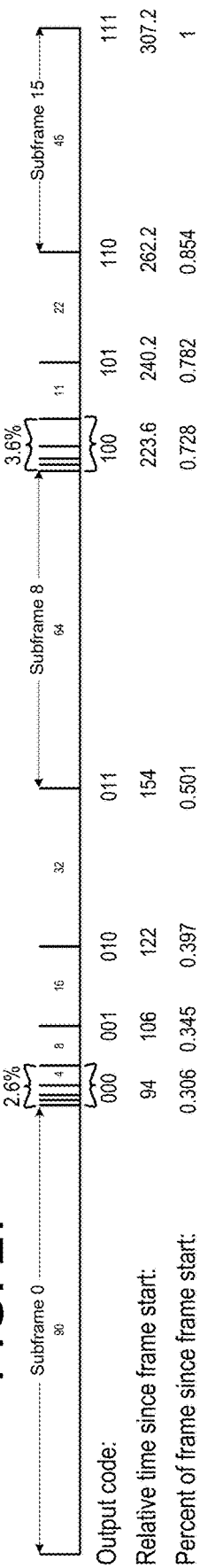
FIG. 27 illustrates an exemplary subframe organization and timecode assignment that may employed within the imaging system of FIG. 26.

FIG. 27 illustrates an exemplary subframe organization and timecode assignment that may employed within the imaging system of FIG. 26. As shown, individual subframes (of which only the longer subframes, $sf_0$, $sf_8$ and $sf_{15}$ are explicitly labeled) are organized so that sampling events are clustered in time (e.g., longer subframe $sf_0$, followed by four relatively brief subframes $sf_1$-$sf_4$; longer subframe $sf_8$ followed by four relatively brief subframes $sf_9$-$sf_{12}$), thus enabling an approximate endtime of two groups of five subframes ($sf_0$-$sf_0$ and $sf_8$-$sf_{12}$) to be represented by single respective timestamp codes. In such an embodiment, the imager may allocate a temporary buffer to, for each pixel on a given row, sum the results of $sf_0$-$sf_4$ prior to transmission to the ISP, and again sum the results of $sf_8$-$sf_{12}$ prior to transmission (during the times the buffer is not needed for this row it can be allocated to creating similar sums for other rows). Due to the summing operation the ISP may not be able to know which one or more of the five summed samples actually exceeded the threshold for a given pixel. But because these two groups of subframes are gathered, respectively, over only 2.6% and 3.6% of the frame time, temporal resolution (which has an uncertainty of only half these intervals) is not greatly impacted. At the same time, however, summing allows a reduction by half of the number of subframes of raw data passed to the ISP, at the expense of provisioning, on the imager, shared summing buffers approximately $\frac{1}{16}^{th}$ the size of the image array. By this design, the number of bits needed to resolve the subframe endtimes is reduced from four to three—in effect, doubling the size of the frame history window for a given timestamp bit depth. In alternative embodiments, e.g., those without imager aggregation of multiple subframes, subframe endtimes may be fully resolved by the subframe timecode (e.g., $\log_2 N$ bits allocated to subframe time code to resolve N subframes). Also, while non-uniform subframe intervals are depicted (i.e., non-uniform sampling intervals), uniform sampling intervals may be used in alternative embodiments. Further, while the same subframe intervals (whether uniform or not) are assumed for all the rows if image pixels in the examples that follow, different subframe interval progressions may be employed and/or the interval progressions may be staggered from row to row. In such embodiments, each row may be tagged with a relative or absolute timestamp related to the time of pixel readout to allow the ISP to calculate exposure intervals.

Having a frame defined with relatively long subframes at the beginning and ends of the frame has several advantages. One is shown in the operation described above-a long subframe followed by several short subframes may allow all to be summed efficiently on the imager. Second, placing short subframes more central to the frame instead of at one end may reduce motion artifacts caused by a moving object with different tones having those tones resolved at far distant portions of the frame. Third, placing a long subframe before a short one virtually guarantees that pixels receiving significant illumination will be reset at the beginning of each short sequence, thus increasing predictability and performance for highlight tones. Fourth, placing a long subframe at the end of the frame virtually guarantees that highlight tones will exceed the threshold and reset at frame end. Since highlight tones may exist in a non-linear region of the imager response curve, it is preferable that these tones be calculated on an integer-frame basis to avoid additional complexity.

Figure 28:
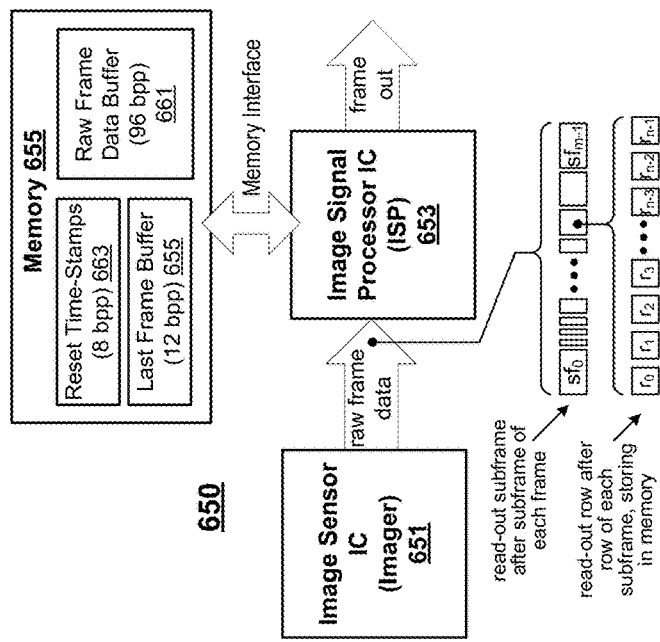
FIG. 28 illustrates an exemplary approach to estimating the output frame values for pixels which yield no non-zero sample values (i.e., no reset events) and thus are "coasting" during a given frame.

FIG. 28 illustrates an exemplary approach to estimating the output frame values for pixels which yield no non-zero sample values (i.e., no reset events) and thus are "coasting" during a given frame. In the embodiment shown, the reference pixel value is applied as an initial estimate for a coasting pixel, but may be attenuated as the reference pixel value ages. By this approach, an initially high-intensity pixel value (indicating a bright point) for which over-threshold events suddenly cease (i.e., scene elements and/or the imaging platform are moving, or a light source has moved or been switched off) will be progressively dimmed in the output frame sequence. In one embodiment, for example, a filtering operation is performed by determining the maximum end-of-frame pixel value that could have been reached by a coasting pixel (i.e., on the assumption that the pixel was on the cusp of an over-threshold event at frame-end), and applying that theoretical maximum, or "coast value," in a filter with the reference pixel value (i.e., a value from the last-frame buffer as the reference pixel value is updated from frame to frame). For example, an infinite impulse response filter is employed in one embodiment, though a finite impulse response filter (FIR) or any other filtering technique or heuristic may be used). Referring to the estimation profile shown in FIG. 28 for a previously high-intensity, but now coasting pixel, it can be seen that, after coasting for a first frame (plus possibly a residual portion of the immediately prior, reference-pixel frame), the estimated intensity drops in accordance with a coast value equal to the conditional-reset threshold divided by the elapsed time in frames. After coasting for a second frame, the coast value and thus the filtered pixel estimation drops to a lower value (i.e., two frames have now passed without an over-threshold event, so that the theoretical maximum rate at which photos are being accumulated within the pixel is accordingly lower), and so forth for subsequent frames. As can be seen, the net effect is a frame-by-frame attenuation in the estimated pixel value of the coasting pixel. Note that the same effect occurs for lower intensity pixels, except that the coast value is not applied to filter the estimate until the coast value drops below the pixel value estimated for the preceding frame (i.e., the most recently updated reference pixel value).

Figure 29:
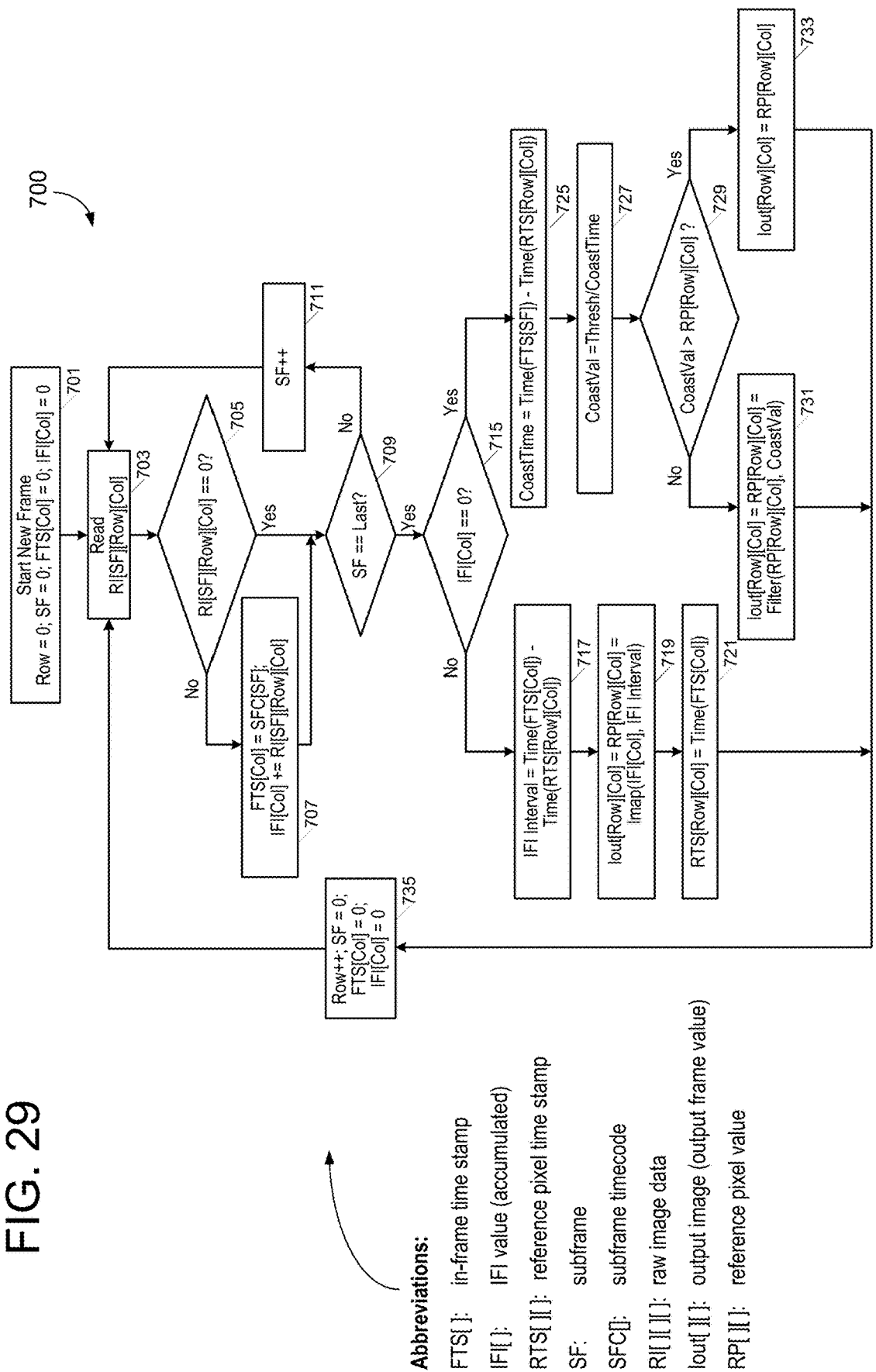
FIG. 29 illustrates an exemplary frame processing sequence that may be executed by the ISP of FIG. 26 to implement the inter-frame integration techniques described in reference to FIGS. 24-28.

FIG. 29 illustrates an exemplary frame processing sequence 700 that may be executed by the ISP of FIG. 26 to implement the inter-frame integration techniques described in reference to FIGS. 24-28. In general, the ISP generates one row of output frame data at a time and thus processes the row, data from all subframes (i.e., obtained from the raw frame data buffer), before proceeding to process the data for $row_{i+1}$. Accordingly, the ISP executes an inner "subframe loop" by sequencing through all subframes with respect to a given row, before advancing row to row in an outer "row loop." Though not specifically shown, an additional "column loop" is executed within the subframe loop, to process each pixel within a given row. This loop is implied in FIG. 29 by a column index, "col" which is sequenced from 0 to N−1 (N being the number of pixel columns in the imager) within each row-processing operation.

Still referring to FIG. 29, at the start of a new frame, a row index ("row"), subframe index ("SF"), in-frame time stamp ("FTS") and IFI value ("IFI") are initialized to zero as shown at 701. Thereafter, at 703, a row of raw image data specified by the subframe and row indices is read from the raw frame buffer. If the raw image data is nonzero for a given pixel (i.e., negative determination at 705, as detected within the column loop), the in-frame time stamp is updated to reflect the timecode corresponding the subframe index, and the raw image data (i.e., pixel value) is accumulated within the IFI value, both as shown at 707. The timestamping and IFI value accumulation are skipped in the case of zero-valued data (affirmative determination at 705). The subframe index is evaluated at 709 to determine whether all subframes have been processed for the current row index. If not, the subframe index is incremented and the operations at 703, 705 and 707 repeated.

After all the subframes corresponding to a given pixel row have been processed, the ISP evaluates the IFI value to determine whether any over-threshold events have occurred during the frame under process. If one or more over-threshold events have occurred (i.e., nonzero IFI value and thus a negative determination at 715), the IFI interval is determined at 717 based on the elapsed time between the in-frame time stamp and reference timestamp. In the embodiment shown, a "time( )" function is invoked to yield a frame-referenced timestamp for the final in-frame reset event, for example, based on a tuple of the current frame number and subframe timecode, though other techniques may be used. At 719, the IFI values and IFI intervals for the current row of pixels (i.e., at least those having non-zero IFI values) are applied in respective image pixel calculations (which may be achieved, at least in part, through a table lookup operation as indicated by the "Imap( )" function), with each resultant image pixel value being assigned as the estimated output image pixel value and also recorded as the new reference pixel value. At 721, a frame-referenced in-frame time stamp is assigned as the new reference pixel time stamp.

Returning to decision 715, for pixels that are coasting in the current frame (i.e., having a zero IFI value) an affirmative determination result at decision 715, followed by a determination of the coast time at 725 (elapsed interval between the end of the current frame, returned by Time (FTS[SF])," and the reference pixel time stamp), and a determination of the coast value at 727 (conditional-reset threshold divided by the coast time). If the coast value is greater than the reference pixel value (i.e., affirmative determination at 729), then the reference pixel value is assigned to be the estimated output pixel value for the current frame at 733. Otherwise, the estimated output pixel value is determined based on the coast value at 731, for example in a filtering operation that blends the coast value and reference pixel value, or by simply assigning the coast value to be the estimated output pixel value.

After the estimated output pixel value and any reference pixel value/timestamp updates have been recorded for the current row, the row index is incremented at 735, and the subframe, in-frame time stamp and IFI values reset in preparation for processing the next row of raw frame data.

Figure 30:
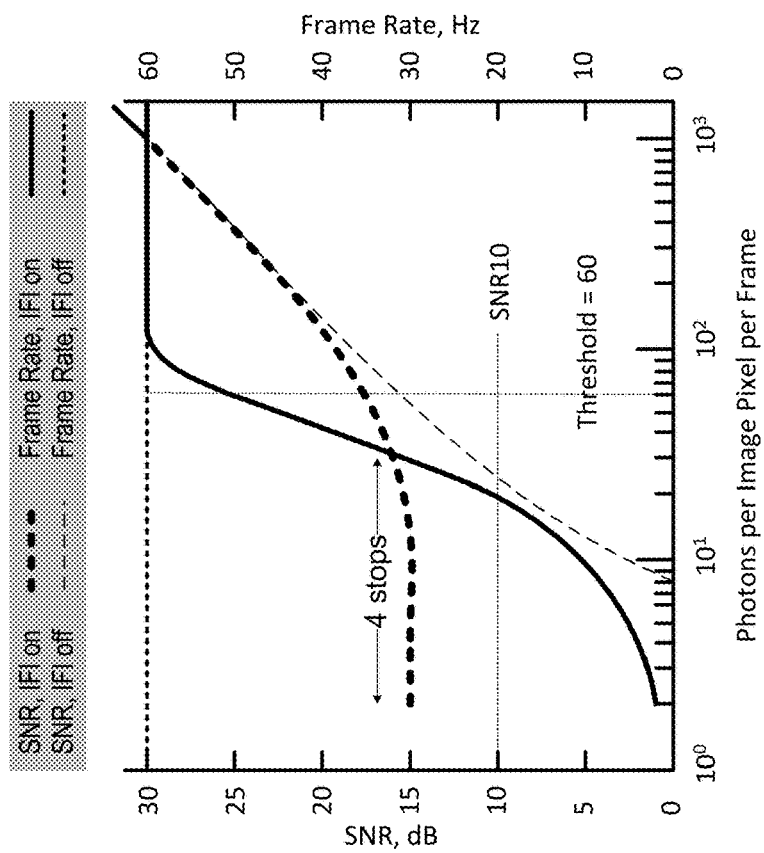
FIG. 30 contrasts the dynamic ranges and SNR achieved in imaging simulations with and without the inter-frame integration described in reference to FIGS. 24-29.
Figure 31:
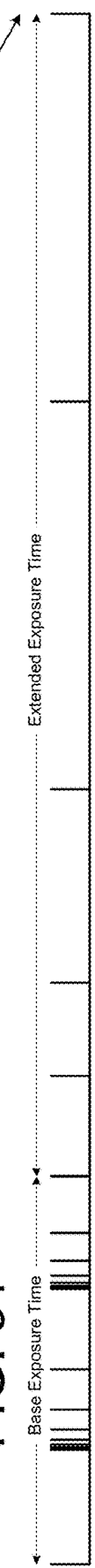
FIG. 31 illustrates an exemplary subframe organization for a still-frame capture mode that includes an extended exposure time.

FIG. 30 contrasts the dynamic ranges and SNR achievable for a given set of imager parameters, with and without the inter-frame integration described above. FIG. 30 also contrasts the effective frame rates with and without IFI. As shown, the IFI approach exhibits substantially improved dynamic range, extending the low light sensitivity (maintaining a 15 db SNR) in this example by approximately four F-stops while converging to the dynamic range profile of residue mode operation at higher light intensities. While the frame rate is steady in residue readout (new data is acquired for each pixel every frame at a 60 Hz frame rate in the example shown), the effective frame rate in the IFI approach drops with light intensity as the elapsed time between pixel reset events grows. The rolloff in frame rate and asymptotic SNR floor are determined by the threshold number of charge carriers required to cause a readout event of a conditional reset pixel. For the example shown, with a threshold of 60, the effective frame rate for a pixel is halved when the average converted photon arrival rate is 30 per nominal frame. A higher threshold would shift these numbers (e.g., a threshold of 256 would cause the SNR to flatten out at about 24 dB, and half the frame rate at an average converted photon arrival rate of 128 (where the residue mode would produce an SNR of approximately 20 dB).

In a given embodiment, various mechanisms can be used to further tailor the response curve. For instance, the system can force a residue readout at a given fraction of the base frame rate, such as every six frames, to limit reduction in frame rate for a given pixel. The system can also use a "softer" encouragement without forcing a residue readout, such as by using two thresholds. For instance, in the FIG. 27 sequence, a threshold of 1024 photons can be used for subframes 0 through 14, and a threshold of 64 photons can be used for subframe 15, such that much higher SNR readings are obtained for all but the last subframe of a frame. For reduced frame rate pixels, transitions to a new output value can also be smoothed by temporal combination of the old and new pixel values at the transition frame.

Although the preceding description is laid out for a video-mode operation, the same principles can be applied for still frame capture. For instance, a user can select a low-light-enhanced still frame mode, where a base shutter speed defines a base exposure time, which is accompanied by an extended exposure time. As an example, a base shutter speed of $1/60^{th}$ of a second results in a 16.7 ms base exposure time with, e.g., 16 subframes, and a 50 ms extended exposure time, with, e.g., 5 additional subframes. For low-light pixels that have not produced an above-threshold reading by the end of the base exposure time, those pixels are allowed to continue to integrate for up until the end of the extended exposure time (at which time a residue reading is produced for all pixels). The ISP constructs the image based, e.g., on the base exposure time for pixels that exceeded the threshold at least once during the base time, and for the first exceedance for pixels that first exceeded the threshold during the extended exposure time, and for the total exposure time for pixels that only produced a residue readout.

ADDITIONAL CONSIDERATIONS

It should be noted that the various circuits disclosed herein can be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions can be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions can be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. An integrated-circuit image sensor comprising:
   an array of pixels;
   a shared output line coupled to a plurality of pixels within the array of pixels;
   a photosensitive element to accumulate charge in response to incident light throughout an exposure interval, the photosensitive element constituting part of a first pixel of the plurality of pixels coupled to the shared output line; and
   a read-out circuit to switchably isolate the first pixel and the photosensitive element therein from the shared output line throughout the exposure interval and, after the exposure interval has transpired, to:
   determine, using the shared output line, whether the charge accumulated within the photosensitive element exceeds a first threshold; and
   in response to determination that the charge accumulated exceeds the first threshold:
      generate, using the shared output line, an analog readout signal representative of the charge accumulated;
      convert the analog readout signal generated using the shared output line into a multi-bit digital value having a numeric value that indicates a magnitude of the analog readout signal; and
      reset the photosensitive element to a nominal discharged state in preparation for further charge accumulation; and
   refrain from resetting the photosensitive element to the nominal discharged state if the charge accumulated is determined not to exceed the first threshold.

2. The integrated-circuit image sensor of claim 1 wherein the read-out circuit to generate the analog readout signal using the shared output line comprises:
   a floating diffusion node;
   a first transistor to switchably form a conduction path for transferring the charge accumulated from the photosensitive element to the floating diffusion node;
   analog output circuitry to generate (i) a first analog output signal on the shared output line representative of a voltage level of the floating diffusion node prior to transferring the charge accumulated to the floating diffusion node and (ii) a second analog output signal on the shared output line representative of a voltage level of the floating diffusion node after transferring the charge accumulated to the floating diffusion node; and
   sample-and-hold circuitry, coupled to the shared output line, generate the analog readout signal based on a difference between the first and second analog output signals.

3. The integrated-circuit image sensor of claim 2 wherein the sample-and-hold circuitry to generate the analog readout signal based on a difference between the first and second analog output signals comprises a first capacitive element to store a voltage level corresponding to the first analog output signal and a circuit to generate, as the analog readout signal, a signal corresponding to a difference between the voltage level stored in the first capacitive element and a voltage level corresponding to the second analog output signal.

4. The integrated-circuit image sensor of claim 2 wherein the analog output circuitry to generate the first and second analog output signals comprises a second transistor having a gate node coupled to the floating diffusion node and a source node coupled to switchably coupled to the shared output line.

5. The integrated-circuit image sensor of claim 2 wherein the read-out circuit to generate the analog readout signal further includes circuitry to reset the floating diffusion node to a reference potential prior to generating the first analog output signal.

6. The integrated-circuit image sensor of claim 1 wherein the read-out circuit to generate the analog readout signal on the shared output line and to convert the analog readout signal into the multi-bit digital value having a numeric value that indicates the magnitude of the analog readout signal comprises:
   a floating diffusion node;
   a first transistor to switchably form a conduction path for transferring the charge accumulated from the photosensitive element to the floating diffusion node;

analog output circuitry to generate on the shared output line (i) a first analog output signal representative of a voltage level of the floating diffusion node prior to transferring the charge accumulated to the floating diffusion node and (ii) a second analog output signal representative of a voltage level of the floating diffusion node after transferring the charge accumulated to the floating diffusion node, the second analog output signal constituting the analog readout signal;

analog-to-digital conversion circuitry to convert the first analog output signal generated on the shared output line into a first digital value and to convert the second analog output signal generated on the shared output line into a second digital value; and circuitry to generate, as the multi-bit digital value having a numeric value that indicates the magnitude of the analog readout signal, a difference between the first and second digital values.

7. The integrated-circuit image sensor of claim 6 wherein the read-out circuit to generate the analog readout signal further includes circuitry to reset the floating diffusion node to a reference potential prior to generating the first analog output signal.

8. The integrated-circuit image sensor of claim 1 wherein the read-out circuit comprises:
 a read-out node; and
 a control circuit to (i) enable charge in excess of the first threshold to be transferred from the photosensitive element to the read-out node, (ii) sense a charge level of the read-out node after enabling the transfer of charge in excess of the first threshold, (iii) determine, based on the sensed charge level of the read-out node, whether the charge accumulated within the photosensitive element exceeds the first threshold, (iv) enable charge in excess of the nominal discharged state to be transferred from the photosensitive element to the read-out node in response to determining that the charge accumulated within the photosensitive element exceeds the first threshold, and (v) generate the analog readout signal according to a charge level of the read-out node after enabling the charge in excess of the nominal discharged state to be transferred to the read-out node.

9. The integrated-circuit image sensor of claim 8 wherein the control circuit comprises:
 a charge-transfer switching element coupled between the photosensitive element and the read-out node; and
 switch control circuitry to apply a first control signal to the charge-transfer switching element to enable the charge in excess of the first threshold to be transferred from the photosensitive element to the read-out node and to apply a second control signal to the charge-transfer switching element to enable the charge in excess of the nominal discharged state to be transferred from the photosensitive element to the read-out node.

10. The integrated-circuit image sensor of claim 9 wherein the charge-transfer switching element comprises a control terminal coupled to receive the first and second control signals at respective times and that effects a charge-conducting channel between the photosensitive element and the read-out node having a first electrostatic potential in response to the first control signal and a second electrostatic potential in response to the second control signal, the second electrostatic potential being greater than the first electrostatic potential.

11. A method of operation within an integrated-circuit image sensor having a shared output line coupled to a plurality of pixel within a pixel array, the method comprising:
 switchably isolating a first pixel of the plurality of pixels from the shared output line throughout an exposure interval;
 throughout the exposure interval, accumulating charge within a photosensitive element of the first pixel in response to incident light; and
 determining, using the shared output line, whether the charge accumulated within the photosensitive element exceeds a first threshold;
 in response to determination that the charge accumulated exceeds the first threshold;
  generating, using the shared output line, an analog readout signal representative of the charge accumulated;
  converting the analog readout signal generated using the shared output line into a multi-bit digital value having a numeric value that indicates a magnitude of the analog readout signal; and
  resetting the photosensitive element to a nominal discharged state in preparation for further charge accumulation; and
 refraining from resetting the photosensitive element to the nominal discharged state if the charge accumulated is determined not to exceed the first threshold.

12. The method of claim 11 wherein generating the analog readout signal using the shared output line comprises:
 generating a first analog output signal on the shared output line representative of a voltage level of a floating diffusion node prior to transferring the charge accumulated from the photosensitive element to the floating diffusion node;
 generating a second analog output signal on the shared output line representative of a voltage level of the floating diffusion node after transferring the charge accumulated from the photosensitive element to the floating diffusion node; and
 generating the analog readout signal based on a difference between the first and second analog output signals.

13. The method of claim 12 wherein generating the analog readout signal based on the difference between the first and second analog output signals comprises capturing a voltage level corresponding to the first analog output signal in a first capacitive element and generating, as the analog readout signal, a signal corresponding to a difference between the voltage level captured in the first capacitive element and a voltage level corresponding to the second analog output signal.

14. The method of claim 12 wherein generating the first and second analog output signals comprises generating the first and second analog output signals via a transistor having a gate node coupled to the floating diffusion node and a source node switchably coupled to the shared output line.

15. The method of claim 12 further comprising resetting the floating diffusion node to a reference potential prior to generating the first analog output signal.

16. The method of claim 11 wherein generating the analog readout signal using the shared output line and converting the analog readout signal representative of the charge accumulated into the multi-bit digital value having the numeric value that indicates the magnitude of the analog readout signal comprises:
 generating a first analog output signal on the shared output line representative of a voltage level of a floating diffusion node prior to transferring the charge accumulated from the photosensitive element to the floating diffusion node;

generating, as the analog readout signal, a second analog output signal on the shared output line representative of a voltage level of the floating diffusion node after transferring the charge accumulated from the photosensitive element to the floating diffusion node; and converting the first and second analog output signals to first and second digital values, respectively; and generating, as the multi-bit digital value having the numeric value that indicates the magnitude of the analog readout signal, a difference between the first and second digital values.

17. The method of claim 16 further comprising resetting the floating diffusion node to a reference potential prior to generating the first analog output signal.

18. The method of claim 11 wherein determining whether the charge accumulated within the photosensitive element exceeds the first threshold comprises: enabling charge in excess of the first threshold to be transferred from the photosensitive element to a read-out node;

sensing a charge level of the read-out node via the shared output line after enabling the transfer of charge in excess of the first threshold; and determining, based on the sensed charge level of the read-out node, whether the charge accumulated within the photosensitive element exceeds the first threshold.

19. The method of claim 18 wherein converting the analog readout signal representative of the charge accumulated into the multi-bit digital value if the charge accumulated is determined to exceed the first threshold comprises enabling charge in excess of the nominal discharged state to be transferred from the photosensitive element to the read-out node.

20. An integrated-circuit image sensor comprising:

an array of pixels;

a shared output line coupled to a plurality of pixels within the array of pixels;

a photosensitive element to accumulate charge in response to incident light throughout an exposure interval, the photosensitive element constituting part of a first pixel of the plurality of pixels coupled to the shared output line; and means for:

switchably isolating the first pixel and the photosensitive element therein from the shared output line throughout the exposure interval determining, using the shared output line, whether the charge accumulated within the photosensitive element exceeds a first threshold;

in response to determination that the charge accumulated exceeds the first threshold;

generating, using the shared output line, an analog readout signal representative of the charge accumulated;

converting the analog readout signal generated using the shared output line into a multi-bit digital value having a numeric value that indicates a magnitude of the analog readout signal; and resetting the photosensitive element to a nominal discharged state in preparation for further charge accumulation; and refraining from resetting the photosensitive element to the nominal discharged state if the charge accumulated is determined not to exceed the first threshold.

* * * * *